United States Patent
Kawamoto et al.

(10) Patent No.: US 7,327,495 B2
(45) Date of Patent: Feb. 5, 2008

(54) IMAGE PROCESSING METHOD AND APPARATUS AND IMAGE FORMING APPARATUS FOR REDUCING MOIRÉ FRINGES IN OUTPUT IMAGE

(75) Inventors: Hiroyuki Kawamoto, Kanagawa (JP); Maki Ohyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1042 days.

(21) Appl. No.: 10/152,850

(22) Filed: May 23, 2002

(65) Prior Publication Data

US 2002/0196470 A1   Dec. 26, 2002

(30) Foreign Application Priority Data

| May 24, 2001 | (JP) | ............................. 2001-154743 |
| Jun. 13, 2001 | (JP) | ............................. 2001-178479 |
| May 14, 2002 | (JP) | ............................. 2002-138005 |

(51) Int. Cl.
*H04N 1/40* (2006.01)
(52) U.S. Cl. ...................... 358/3.07; 358/3.26; 382/299
(58) Field of Classification Search ................ 358/1.2, 358/1.9, 3.06–3.1, 3.26–3.27, 2.1; 382/254, 382/260, 299, 300
See application file for complete search history.

(56) References Cited

U.S. PATENT DOCUMENTS

| 5,237,625 A | | 8/1993 | Yamashita et al. |
| 5,541,594 A | * | 7/1996 | Huang et al. ................. 341/51 |
| 5,704,020 A | * | 12/1997 | Hanyu et al. ................ 358/1.2 |
| 6,118,547 A | | 9/2000 | Tanioka |
| 6,122,412 A | * | 9/2000 | Noguchi et al. ............ 382/312 |
| 6,757,449 B1 | * | 6/2004 | Loce .......................... 382/299 |

FOREIGN PATENT DOCUMENTS

| JP | 5-41793 | 2/1993 |
| JP | 9-9038 | 1/1997 |
| JP | 10-32713 | 2/1998 |
| JP | 2000-011188 | 1/2000 |

* cited by examiner

*Primary Examiner*—David Moore
*Assistant Examiner*—Stephen Brinich
(74) *Attorney, Agent, or Firm*—Dickstein Shapiro LLP

(57) ABSTRACT

A spatial filter applies a modulation transfer function correction process so as to increase a number of bits of input image data. A high-resolution converter converts the image data into output image data having a density higher than a sampling density of the input image data. One of the spatial filter and the resolution converter processes the image data after the other of the spatial filter and the resolution converter has processed the image data A possibility of saturation of an output of the spatial filter is decreased, thereby decreasing generation of moiré in a saturation calculation.

36 Claims, 18 Drawing Sheets

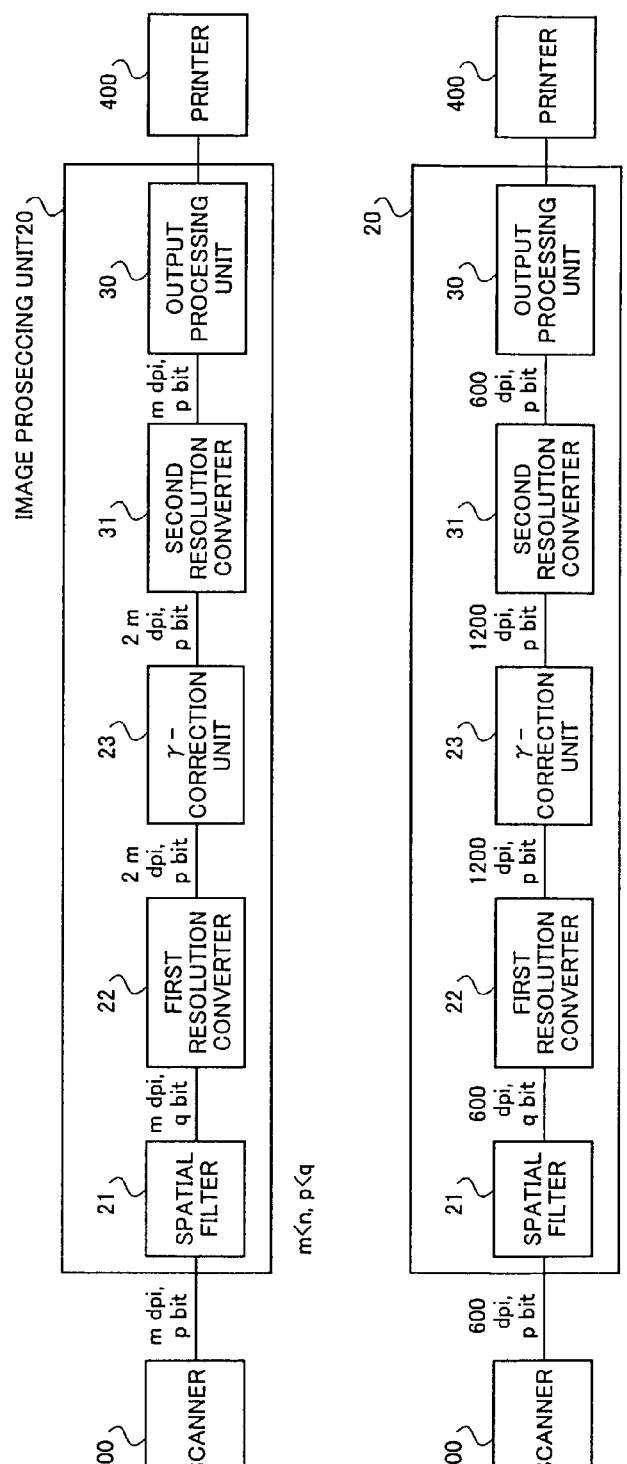

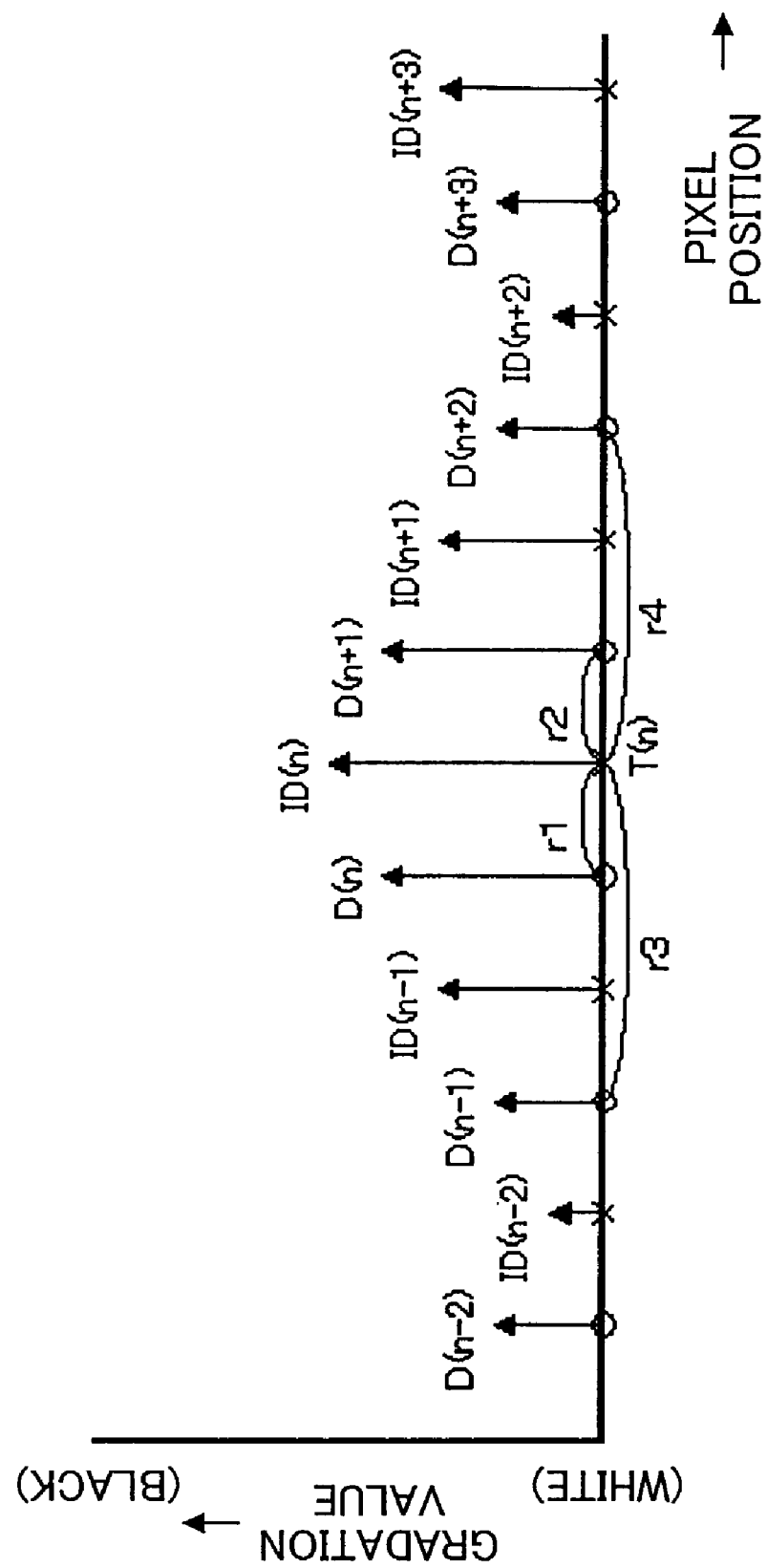

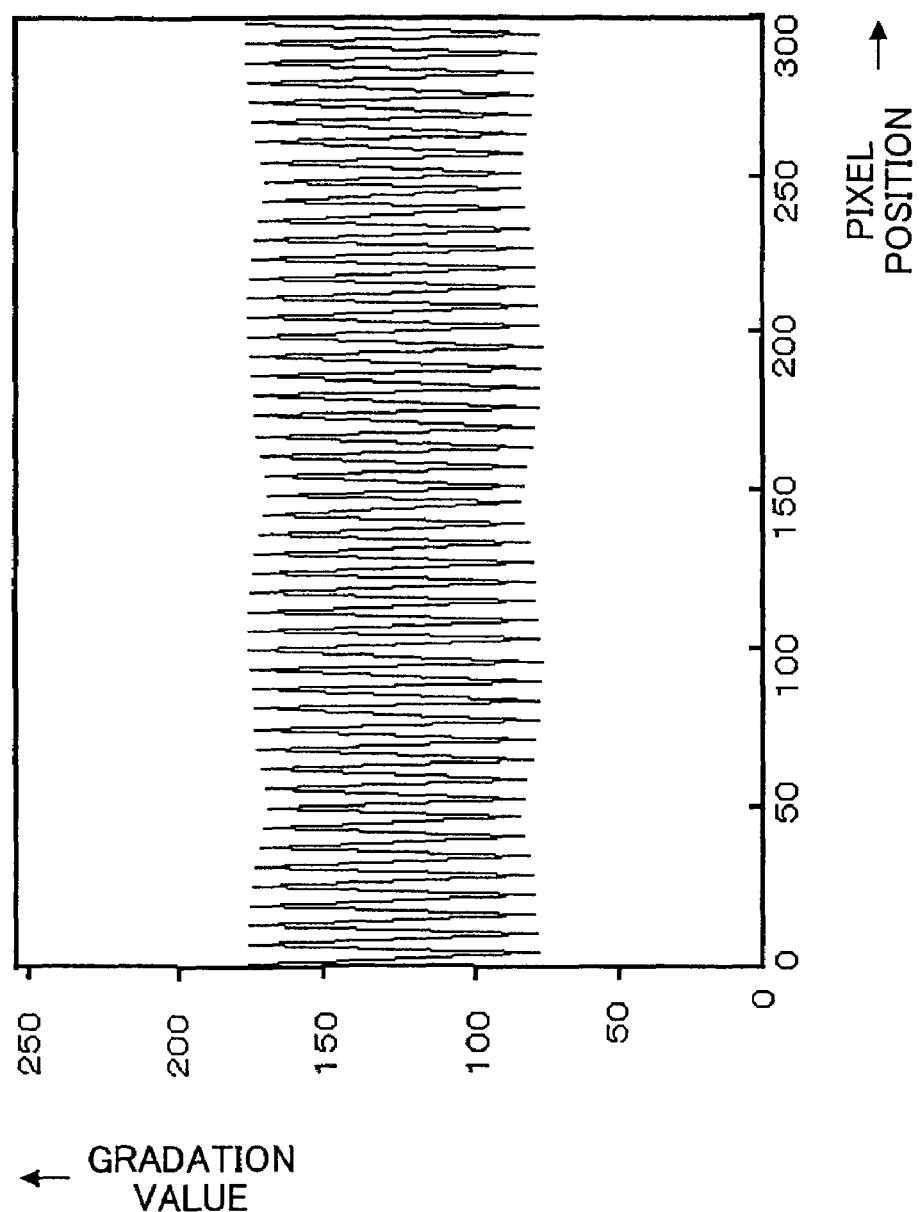

IMAGE PROCESSING METHOD AND APPARATUS AND IMAGE FORMING APPARATUS FOR REDUCING MOIRÉ FRINGES IN OUTPUT IMAGE

BACKGROUND OF THE INVENTION

1. Field of the Invention

The present invention generally relates to image data processing and, more particularly, to a digital image processing technique which improves an image quality by reducing moiré fringes generated in a fine-pitch halftone image.

2. Description of the Related Art

Conventionally, in a digital copy machine, an unevenness of intensity referred to as moiré is generated in a reproduced image of a halftone image, which deteriorates an image quality. There are following causes of generation of moiré.

1) a mutual interference between a frequency of dots in an original image and a sampling frequency for resolving the original image into pixels when reading the original image; and 2) a saturation operation by spatial filtering means, or a nonlinear process such as sharp gamma-correction process.

As for a method of suppressing generation of moiré due to the above-mentioned cause 1), there is a method of reducing moiré by a smoothing filter process, which makes an input image unfocused. As for a method of suppressing generation of moiré due to the above-mentioned cause 2), there is a method of reducing moiré by applying a weak filtering process, which cannot cause saturation, or a smooth gamma correction process.

Japanese Laid-Open Patent Application No. 5-41793 discloses a digital image processing apparatus which corrects moiré prior to a spatial filtering process including a modulation transfer function (MTF) correction such as sharpening of character edges and smoothing of a halftone image. In this example of a moiré correction, input image data of 400 dpi (dot/inch) is processed by an interpolation method so as to compute interpolated image data corresponding a position between adjacent pixels in the input image data, and a smoothing process is applied to an assemble (image data of 800 dpi) of the input image data and the interpolated image data so as to produce image data of 400 dpi.

Japanese Laid-Open Patent Application No. 9-9038 discloses an image forming apparatus, which performs a laser recording operation based on binary data obtained by binarizing image data. In this image forming apparatus, a spatial filtering process is applied to the image data obtained by a sampling frequency of 400 dpi so as to correct sharpness and remove moiré. Then a gamma processing which is an intensity correction is applied to the image data, and the image data is subjected to a high-density resolution conversion process to 600 dpi. Thereafter, the binarizing process is applied to the 600 dpi image data.

Additionally, Japanese Laid-Open Patent Application No. 10-32713 also discloses an image forming apparatus, which performs a laser recording operation based on binary data obtained by binarizing image data. In this image forming apparatus, the high-density resolution conversion process is applied first to convert image data from 400 dpi to 600 dpi. Then a spatial filtering process and gamma-correction process are applied to the image data of 600 dpi, and the processed image data is binarized to obtain the binary image data.

As mentioned above, the image processing operation using the above-mentioned high-resolution conversion process can reduce moiré generated in a reproduced image. However, the reproduced image may be unfocused, or resolution or sharpness may deteriorate in a line-drawing part such as characters. An image having less moiré may be obtained by increasing the image density for image reading. However, in order to increase the image density, a CCD reading apparatus having a corresponding pixel resolution capability and it is difficult to achieve such a CCD reading apparatus in respect of a technical matter and a manufacturing cost.

SUMMARY OF THE INVENTION

It is a general object of the present invention to provide an improved and useful image processing method and apparatus in which the above-mentioned problems are eliminated.

A more specific object of the present invention is to provide an image processing method and apparatus which suppresses generation of moiré in a halftone image while maintaining sharpness of a line-drawing part such as characters.

Another object of the present invention is to provide an image processing apparatus which suppresses generation of moiré with a simplified structure.

A further object of the present invention is to provide an image processing apparatus which suppresses generation of moiré with a reduced cost.

In order to achieve the above-mentioned objects, there is provided according to one aspect of the invention an image processing method comprising: applying a spatial filtering process with an input dynamic range larger than an output dynamic range and also applying a high-resolution conversion process to increase an image density of image data.

According to the present invention, a possibility of saturation of an output of a spatial filter is decreased, thereby decreasing generation of moiré in the saturation calculation. Additionally, according to the high-resolution conversion, a possibility of generation of moiré due to mutual interference between the dot period in a halftone image of an original image and a sampling period for changing to pixel data is reduced. Since the image data is converted into high-density data, a possibility of generation of moiré is reduced even if a non-linear process such as a sharp gamma process is applied in a subsequent stage.

The image processing method according to the present invention may further comprise: applying a low-resolution conversion process to decrease the image density after applying to the image data the spatial filtering process and the high-resolution conversion process. The image processing method according to the present invention may further comprise: applying a gamma correction process to the image data after applying the high-resolution conversion process. Additionally, in the image processing method, the spatial filtering process may be a filtering process of a modulation transfer function correction which sharpens an image edge.

Additionally, there is provided according to another aspect of the present invention an image processing method comprising: applying to image data a high-resolution conversion to increase an image density of the image data and a spatial filtering process; and thereafter, applying a low-resolution conversion to decrease-the image density.

According to this invention, a possibility of generation of moiré due to mutual interference between the dot period in a halftone image of an original image and a sampling period for changing to pixel data is reduced. Although a harmonic wave is generated, which may be a cause of generation of moiré, the generation of moiré due to the process of the spatial filter can be reduced by using, if necessary, a smoothing filter in a down sampling so as to cut off the harmonic wave and converting into low resolution data such as original image data which is not subjected to the high-resolution conversion.

The above-mentioned image processing method may further comprise: applying a gamma-correction process to the image data after applying the high-resolution conversion process. The spatial filtering process may be a filtering process of a modulation transfer function correction which sharpens an image edge.

Additionally, there is provided according to another aspect of the present invention an image processing apparatus comprising: a spatial filter which applies a modulation transfer function correction process so as to increase a number of bits of input image data; and a high-resolution converter which converts the image data into output image data having a density higher than a sampling density of the input image data, wherein one of the spatial filter and the resolution converter processes the image data after the other of the spatial filter and the resolution converter has processed the image data.

According to this invention, the image data which represents clear line drawing such as a character part by the MTF correction filtering process. Although a possibility of generation of moiré is increased due to the MTF correction filtering process, a possibility of saturation of an output of a spatial filter is decreased, thereby decreasing generation of moiré in the saturation calculation. Additionally, according to the high-resolution conversion, a possibility of generation of moiré due to mutual interference between the dot period in a halftone image of an original image and a sampling period for changing to pixel data is reduced. Since the image data is converted into high-density data, a possibility of generation of moiré is reduced even if a non-linear process such as a sharp gamma process is applied in a subsequent stage.

The above-mentioned image processing apparatus may further comprise a gamma-correction unit which applies a gamma-correction to the image data which has been processed by the high-resolution converter. The image processing apparatus may further comprise a low-resolution converter which decreases the density of the gamma-corrected image data.

Additionally, there is provided according to another aspect of the present invention an image processing apparatus comprising: an image reading unit which reads an image or picture to generate image data; and an image processing apparatus including: a spatial filter which applies a modulation transfer function correction process so as to increase a number of bits of the image data supplied from the image reading unit; and a high-resolution converter which converts the image data into output image data having a density higher than a sampling density of the input image data, wherein one of the spatial filter and the resolution converter processes the image data after the other of the spatial filter and the resolution converter has processed the image data.

According to this invention, the image data which is read by the image reading units represents clear line drawing such as a character part by the MTF correction filtering process. Although a possibility of generation of moiré is increased due to the MTF correction filtering process, a possibility of saturation of an output of a spatial filter is decreased, thereby decreasing generation of moiré in the saturation calculation. Additionally, according to the high-resolution conversion, a possibility of generation of moiré due to mutual interference between the dot period in a halftone image of an original image and a sampling period for changing to pixel data is reduced. Since the image data is converted into high-density data, a possibility of generation of moiré is reduced even if a non-linear process such as a sharp gamma process is applied in a subsequent stage.

The image reading apparatus may further comprise a gamma-correction unit which applies a gamma-correction to the image data which has been processed by the high-resolution converter. The image reading apparatus may further comprise a low-resolution converter which decreases the density of the gamma-corrected image data.

Additionally, there is provided according to another aspect of the present invention an image forming apparatus comprising: an image processing apparatus including: a spatial filter which applies a modulation transfer function correction process so as to increase a number of bits of the image data supplied from the image reading unit; and a high-resolution converter which converts the image data into output image data having a density higher than a sampling density of the input image data, wherein one of the spatial filter and the resolution converter processes the image data after the other of the spatial filter and the resolution converter has processed the image data; and a printer which forms an image on a recording sheet based on the image data output from the image processing apparatus.

The above-mentioned image forming apparatus may further comprise a gamma-correction unit which applies a gamma-correction to the image data which has been processed by the high-resolution converter. The above-mentioned image forming apparatus may further comprise a low-resolution converter which decreases the density of the gamma-corrected image data. The image forming apparatus may further comprise an image reading unit which reads an image or picture to generate the image data so as to supply the image data to the image processing apparatus.

Additionally, there is provided according to another aspect of the present invention an image forming apparatus comprising: a resolution converter which converts image data of p bits, which is obtained by optically reading an original image by a sampling density of m dpi, into high-density image data of n dpi and p bits, where n is greater than m; a spatial filter changing the high-density image data into large dynamic range image data of n dpi and q bits, where q is greater than p; a gamma correction unit which adjusts an intensity of the image data after being processed by the spatial filter; an output processing unit which converts the gamma-corrected image data into output data for printing; and a printer which produces a visible image based on the output data of the output processing unit.

Additionally, there is provided according to another aspect of the present invention an image forming apparatus comprising: a spatial filter which changes image data of p bits, which is obtained by optically reading an original image by a sampling density of m dpi, to large dynamic range image data of m dpi and q bits, where q is greater than p; a resolution converter which converts the large dynamic range image data of m dpi and q bits into high-resolution image data of n dpi and p bits, where n is greater than m; a gamma correction unit which adjusts an intensity of the image data after being processed by the resolution converter; and a printer of n dpi and a multiple number of gradation.

Additionally, there is provided according to another aspect of the present invention an image forming apparatus comprising: a spatial filter which changes image data of p bits, which is obtained by optically reading an original image by a sampling density of m dpi, to large dynamic range image data of m dpi and q bits, where q is greater than p; a resolution converter which converts the large dynamic range image data of m dpi and q bits into high-resolution image data of n dpi and p bits, where n is greater than m; a gamma correction unit which adjusts an intensity of the image data after being processed by the resolution converter; an output processing unit which converts the gamma-corrected image data into output data for printing; and a printer which produces a visible image based on the output data of the output processing unit.

In the above-mentioned image forming apparatus, the output processing unit may be a simple binarizing unit which converts the gamma corrected image data into binary data as the output data for printing; and the printer may have n dpi and a binary gradation number so as to form a visible image based on the binary data from the simple binarizing unit. Alternatively, the output processing unit maybe a binary error diffusion unit which converts the gamma corrected image data into binary data as the output data for printing by a binarization according to an error diffusion method; and the printer may have n dpi and a binary gradation number so as to form a visible image based on the binary data from the binary error diffusion unit.

Additionally, there is provided according to another aspect of the present invention an image forming apparatus comprising: a spatial filter which changes image data of p bits, which is obtained by optically reading an original image by a sampling density of m dpi, to large dynamic range image data of m dpi and q bits, where q is greater than p; a resolution converter which converts the large dynamic range image data of m dpi and q bits into high-resolution image data of n dpi and q bits, where n is greater than m; a gamma correction unit which adjusts an intensity of the image data after being processed by the resolution converter; an output processing unit which converts the gamma-corrected image data into output data for printing; and a printer which produces a visible image based on the output data of the output processing unit.

Additionally, there is provided according to another aspect of the present invention an image forming apparatus comprising: a first resolution converter which converts image data of p bits, which is obtained by optically reading an original image by a sampling density of m dpi, into high-resolution image data of n dpi and p bits, where n is greater than m; spatial filter which applies a modulation transfer function (MTF) correction to the high-resolution image data of n dpi and p bits after the conversion of the first resolution converter; a gamma correction unit which adjusts an intensity of the image data after being processed by the spatial filter; a second resolution converter which converts the gamma corrected image data of n dpi and p bits into image data of m dpi and q bits; an output processing unit which converts the image data of n dpi and p bits after the conversion of the second resolution converter into output data for printing; and a printer which produces a visible image based on the output data of the output processing unit.

According to this invention, an image enhancement can be achieved with less generation of moiré as compared to a conventional system having a spatial filter. In the image forming apparatus, n may be an integral multiple of m. This achieves a high resolution conversion-with high accuracy, and, thus, an image processing system having less generation of moiré can be achieved with a low cost.

Additionally, there is provided according to another aspect of the present invention an image forming apparatus comprising: a spatial filter which changes image data of p bits, which is obtained by optically reading an original image by a sampling density of m dpi, to large dynamic range image data of m dpi and q bits, where q is greater than p; a first resolution converter which converts the large dynamic range image data of m dpi and q bits after being processed be the spatial filter into high-resolution image data of n dpi and p bits, where n is greater than m; a gamma correction unit which adjusts an intensity of the image data after being processed by the first resolution converter; a second resolution converter which converts the gamma corrected image data of m dpi and p bits into image data of m dpi and p bits; an output processing unit which converts the image data of m dpi and p bits after the conversion of the second resolution converter into output data for printing; and a printer which produces a visible image based on the output data of said output processing unit.

According to this invention, an image enhancement can be achieved with less generation of moiré as compared to a conventional system having a spatial filter. Additionally, a number of line buffers for the process of the spatial filter can be reduced. In the image forming apparatus, n may be an integral multiple of m. This achieves a high-resolution conversion with high accuracy, and, thus, an image processing system having less generation of moiré can be achieved with a low cost.

Other objects, features and advantages of the present invention will become more apparent from the following detailed description when read in conjunction with the accompanying drawings.

BRIEF DESCRIPTION OF THE DRAWINGS

FIG. 9A is a block diagram of the image processing unit 20 shown in FIG. 7B in a fourth mode of operation of the fourth embodiment;

FIG. 9B is a block diagram of the image processing unit shown in FIG. 7B in a fifth mode of operation of the fourth embodiment;

FIG. 10 is a graph showing data and sampling points in an interpolation by a resolution converter;

FIG. 11 is a graph showing image data plotted in the primary scanning direction, the image data being read by a scanner of m=600 dpi and p=8 bits at 99 lpi;

DETAILED DESCRIPTION OF THE PREFERRED EMBODIMENTS

First Embodiment

Figure 1:
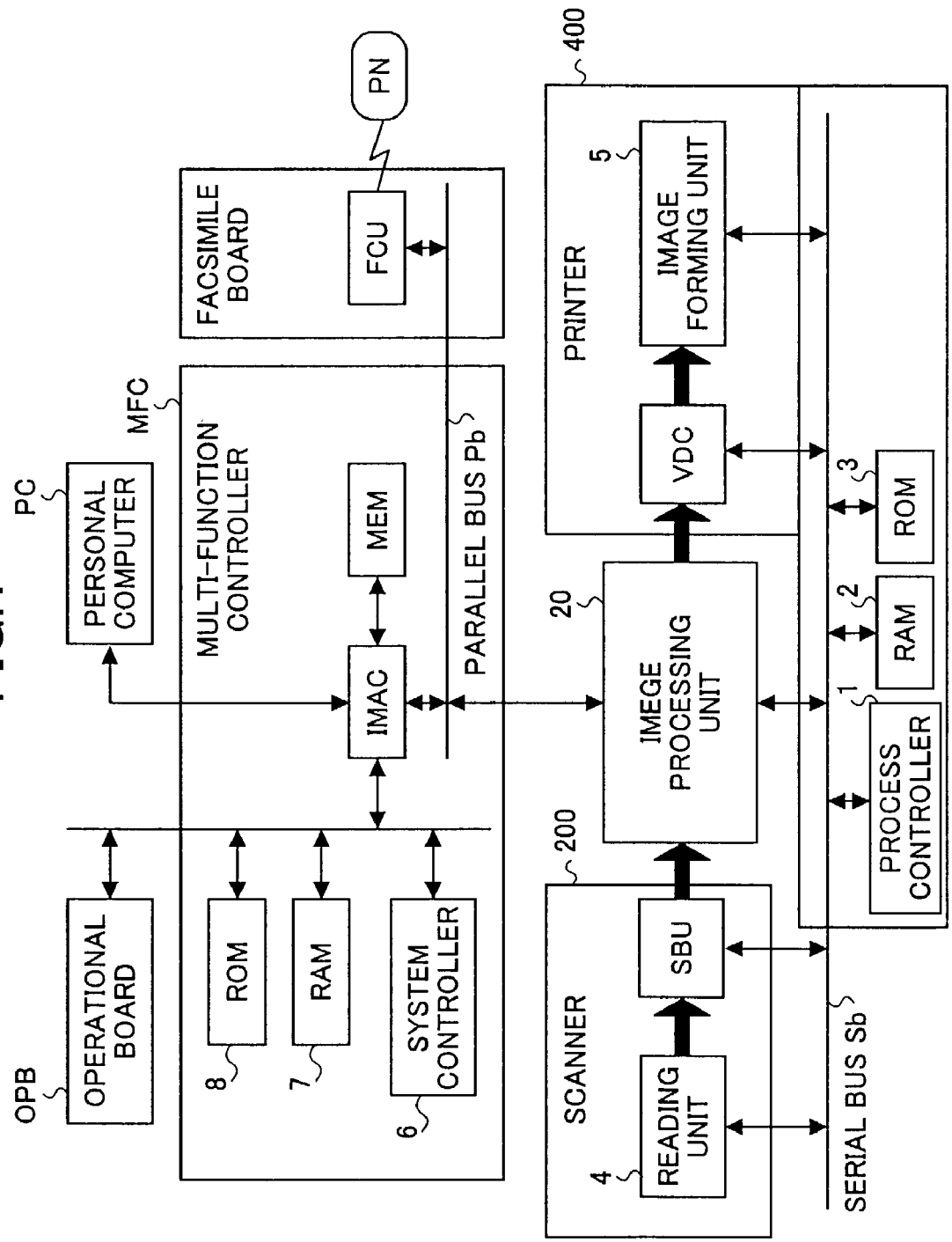
FIG. 1 is a block diagram of an image forming apparatus according to a first embodiment of the present invention.

FIG. 1 is a block diagram of an image forming apparatus according to a first embodiment of the present invention. The image forming apparatus shown in FIG. 1 is a multi-function digital full-color copy machine having an image processing unit 20, a scanner 200 and a color printer 400. The scanner 200 read an original image and supply image data to the image processing unit 20. The image processing unit 20 applied a process to the image data and supplies the processed image data to the color printer 400. The color printer outputs a visual image based on the processed image data supplied from the image processing unit 20.

The digital full-color copy machine can print image data by the color printer when the image data is supplied from a host unit such as a personal computer through a LAN or a parallel interface. Additionally, image data obtained by reading an original image by the scanner 200 can be transmitted to a remote facsimile machine, and image data received can be printed by the color printer 400. The copy machine is connected to a public telephone network PN through a private branch exchange so as to communicate with a remote facsimile machine or a management server of a service center through the public telephone network.

The scanner 200 has a reading unit 4 which projects a light onto an original image. The light reflected by the original image is received by a light-receiving element such as a charge coupled device (CCD) provided on a sensor board unit (SBU). The reflected light is converted into an electric signal by the CCD, and is converted into digital signal (digital image data). Then the digital image data is output from the SBU to the image processing unit 20.

A system controller 6 and a process controller 1 communicate with each other through a parallel bus Pb and a serial bus Sb. The image processing unit 20 performs a data format conversion for the data interface between the parallel bus Pb and the serial bus Sb.

The image data from the SBU is transferred to the image processing unit 20. The image processing unit 20 corrects signal deterioration associated with an optical system of the scanner 200 and the quantization to the digital signal. The image processing unit also corrects the image data so as to match the image data to the image recording characteristic of the printer 400, and transfers the corrected image data to a multi-function controller (MFC). The image data transferred to the MFC is stored in a memory MEM. The corrected image data may be supplied to the printer 400 after being subjected to a printer output process.

That is, the image processing unit 20 has a job which accumulates and reuses read image data in the memory MEM and a job which outputs the read image data to a video data control VDC (hereinafter, simply referred to as VDC) without accumulating the image data in the memory MEM and carries out an imaging output by the laser printer 400. When making a plurality of copies of an original document of one sheet, the reading unit 4 is operated only once, the read image data is accumulated in the memory MEM, and the accumulated data is read from the memory MEM a plurality of times. When making one copy of an original document of one sheet, what is necessary is just to process the read image data to a printer output as it is, and, therefore, it is not necessary to store the read image data in the memory MEM.

When not using the memory MEM, the image processing unit 20 applies to the read image data the image reading correction and a correction appropriate to the printer output characteristics. Then, the image processing unit 20 performs image quality processes for forming an image by the printer, such as conversion into area gradation. The output image data after being subjected to the image quality processes is transferred to the VDC. The VDC applies to the output image data a post process with respect to dot arrangement and a pulse control for reproducing post processing. An image forming unit 5 of the laser printer 400 forms a reproduction image on a transfer paper.

When the image data is accumulated in the memory MEM and an additional process is performed on the image data when the accumulated image data is read, such as, for example, rotation of the direction of an image, synthesis of an image, etc., the image data to which the image reading correction was made is sent to an image memory access controller IMAC (hereinafter, referred to as IMAC). Based on the control of a system controller 6, the IMAC performs an access control of image data and the memory MEM, a development (a character code/character bit conversion) of print data for an external personal computer (hereinafter, referred to as PC) and compression/decompression of image data for effective use of a memory. The data sent to the IMAC is accumulated in the memory MEM, and the accumulated data is read when needed. The read data is decompressed by the IMAC and is restored to the original image data, and the restored image data is returned from the IMAC to the image processing unit 20 via the parallel bus.

The image data returned to the image processing unit 20 is subjected to an image quality process, and is also subjected to a pulse control by the VDC. Then, the image forming unit 5 forms a visible image (toner image) on a transfer paper.

The facsimile transmitting function which is one of the multiple functions applies an image reading correction to the read image data by the image processing unit 20, and transfers the corrected read image data to a facsimile control unit FCU (simply referred to as FCU) via the parallel bus Pb. The FCU converts image data into data for a public line communication network PN (hereinafter, simply referred to as PN), and transmits the data to PN as facsimile data. When facsimile data is received, the FCU converts the facsimile data from the PN into image data into image data, and transfers the image data to the image processing unit 20 via the parallel bus Pb. In this case, no particular image quality process is performed, but a rearrangement of dots and a pulse control are performed in the VDC, and a visible image is formed on a transfer paper in the image forming unit 5.

When operating a plurality of jobs, for example, a copy function, a facsimile transceiver function and a printer output function in parallel, a system controller 6 and a process controller 1 control an assignment of a right of use of the reading unit 4, the image forming unit 5 and the parallel bus Pb to the jobs.

The process controller 1 controls flow of the image data. The system controller 6 controls the whole system and manages activation of each resource. A selection function of the multi function digital copy machine sets contents of a process, such as a copy function and a facsimile function, based on a selection input through an operation board OPB.

Figure 2:
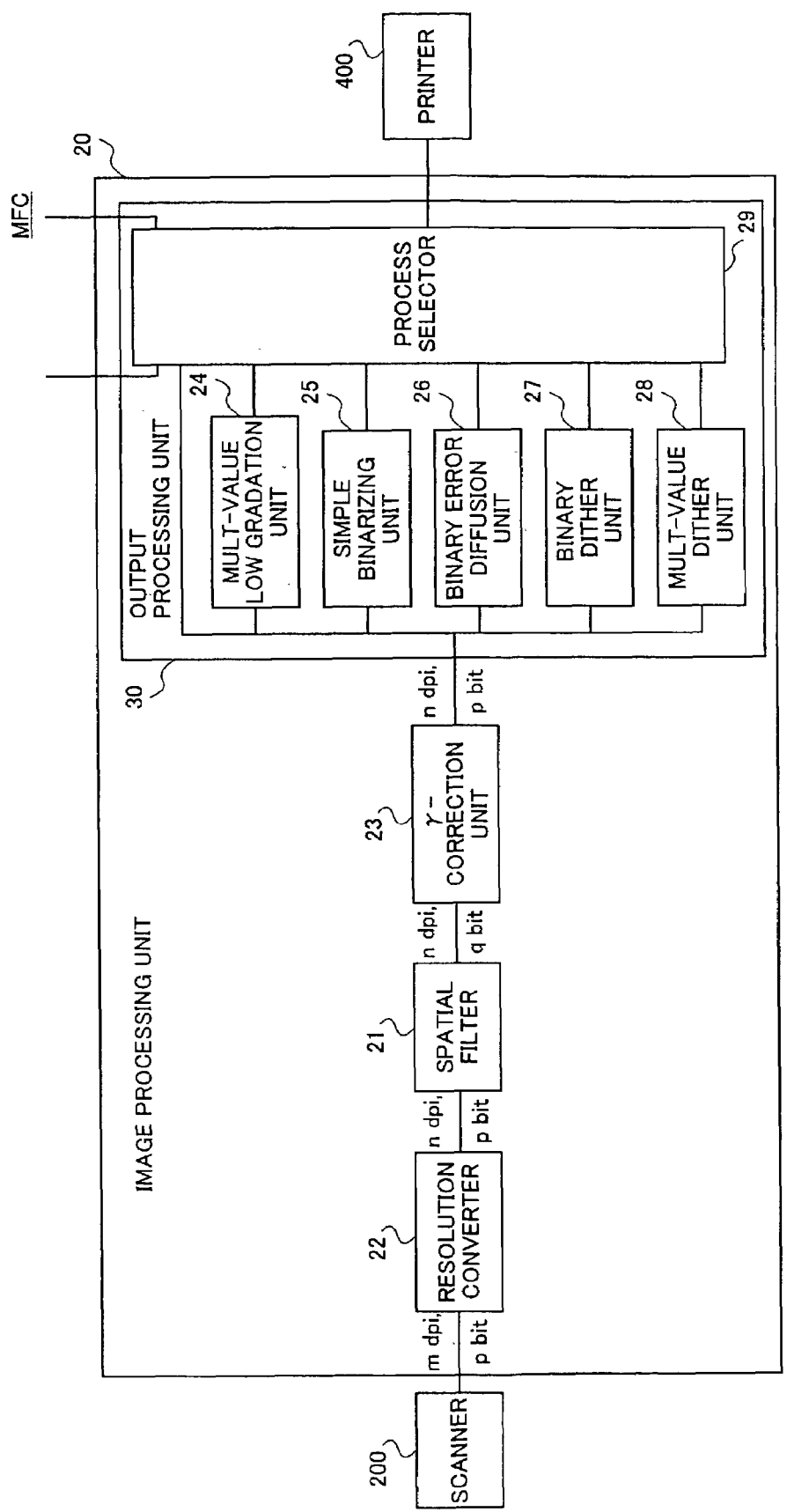
FIG. 2 is a block diagram showing a function relevant to the image processing of the present invention.

FIG. 2 is a block diagram showing the function relevant to the image processing of the present invention in the image processing function of the image processing unit. Analog image signals of each color, R, G, B, read by the scanner 200 with m dpi (m pixels per 1 inch) are converted into digital image data of p bits, respectively, and are output as p-bit color image data. For example, m=600 and p=8. After image data is subjected to various processes by the image processing unit 20, the image data is output to the laser printer 400.

First, the image data of m dpi and p bits, which is output from the scanner 200, is converted into image data of n dpi and p bits by an interpolation operation using a three-dimensional function convolution method by a resolution converter 22. Where p<q, for example, p=8 and q=10.

A description will be given, with reference to FIG. 10, of an interpolation operation process. When obtaining image data ID (n) of a virtual sampling point T(n), the value ID(n) of the virtual sampling point T(n) is calculated based on the vales of the image data D(n−1), D(n), D(n+1) and D(n+2) of the real sampling pixels and distances r1, r2, r3 and r4 between the virtual sampling point T(n) and each of the real sampling points. For example, when carrying out a density conversion with a double resolution by the three-dimensional convolution method, the image data ID(n) of the virtual sampling point T(n) is calculated as follows.

$$ID(n) = -(1/8)D(n-1) + (5/8)D(n) + (5/8)D(n+1) - (1/8)D(n+2)$$

The image data ID(n) is inserted between the real sampling image data D(n) and D(n+1). Similarly, ID(n−2), ID(n−1), ID(n), ID(n+1) and ID(n+2) are calculated so as to perform the interpolation.

Subsequent to the process of the resolution converter 22, a filtering process of a spatial filter 21 is performed. The input of the spatial filter 21 is n dpi and p bits, and the output is n dpi and q bits. Then, a gamma correction is applied to the image data by a gamma correction unit 23, and, in the present embodiment, the image data of n dpi and p bits is supplied to an output processing unit 30. Here, m<n, and, for example, m=600 and n=1200.

Figure 12:
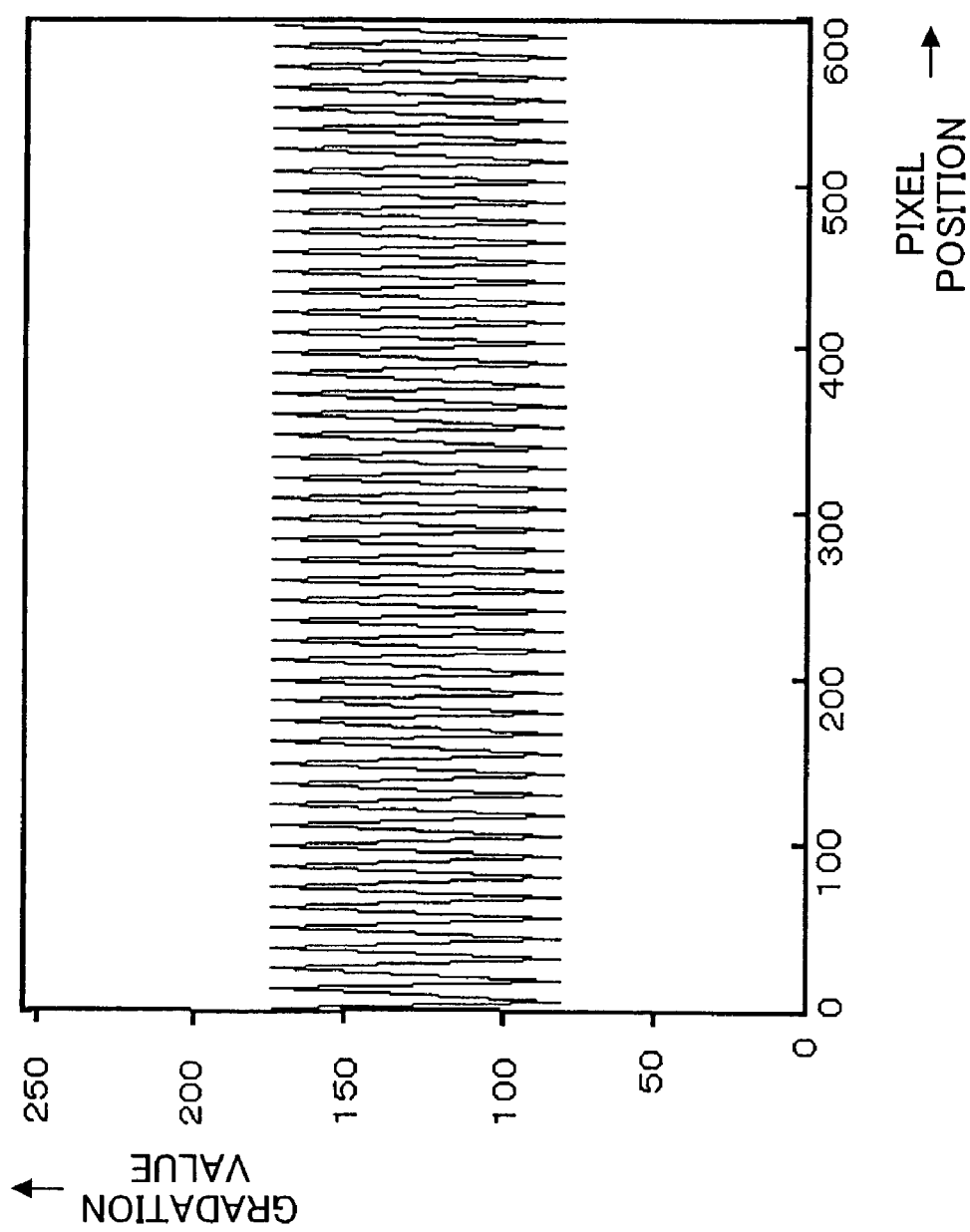
FIG. 12 is a graph showing image data, which is converted into 1200 dpi according to a high-resolution conversion.
Figure 13:
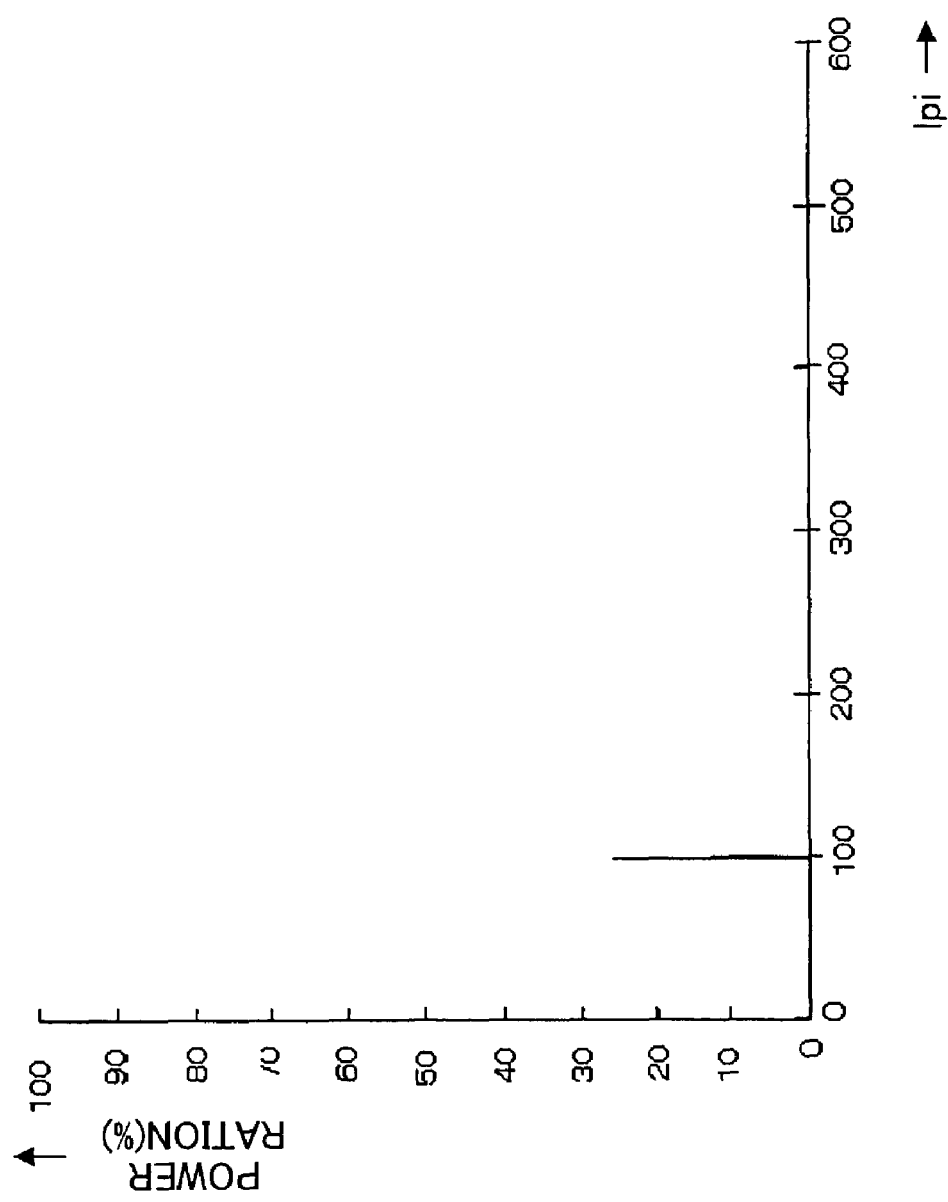
FIG. 13 is a graph showing a frequency characteristic of image data after the high-resolution conversion shown in FIG. 12.
Figure 14:
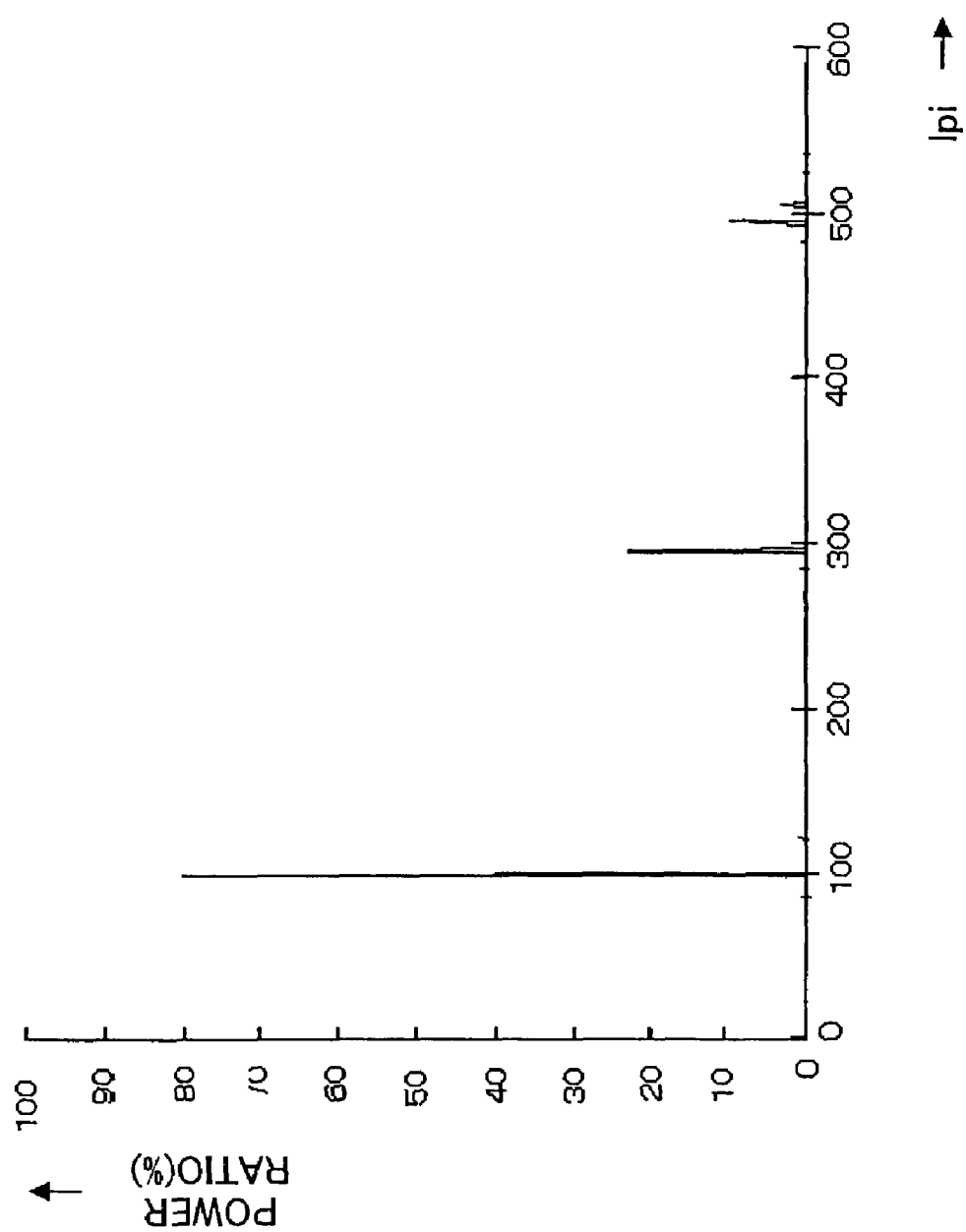
FIG. 14 is a graph showing a frequency characteristic of the image data after being changed from m=600 dpi to n=1200 dpi.

FIG. 11 is a graph showing the image data plotted in the primary scanning direction, the image data being read by the scanner 200 of m=600 dpi and p=8 bits at 99 lpi (lines/inch). FIG. 12 is a graph showing image data, which is converted into 1200 dpi according to the above-mentioned interpolation. As shown in FIG. 11, the peak distribution of the image data read by the scanner 200 draws a wave due to the moiré caused by the mutual intervention between the dot period (99 lpi) of the original image and the sampling period when decomposing the read image into pixels. This moiré appears still more notably due to the saturate calculation by the subsequent spatial filter 21 and the nonlinear processing by the gamma correction unit 23. On the other hand, as shown in FIG. 12, the wave is not generated in the image data after the high-resolution conversion. Thus, the image data after the high-resolution conversion is equivalent to image data obtained by reading the original image at a sampling frequency twice the real sampling frequency. Thereby, the moiré due to the mutual intervention between the dot period of the original image and the sampling period when decomposing into pixels at the time of image reading can be eliminated. FIG. 14 is a graph showing the frequency characteristics of the image data, which is obtained by reading the multi-line image shown in FIG. 11, by the scanner of 600 dpi. FIG. 13 is a graph showing the frequency characteristics of the image data after the high-resolution conversion shown in FIG. 12 is performed. The frequency characteristics of the image data after the high-resolution conversion indicate a single spectrum of 99 lpi, and, thus, moiré does not appear in the real space.

Figure 15:
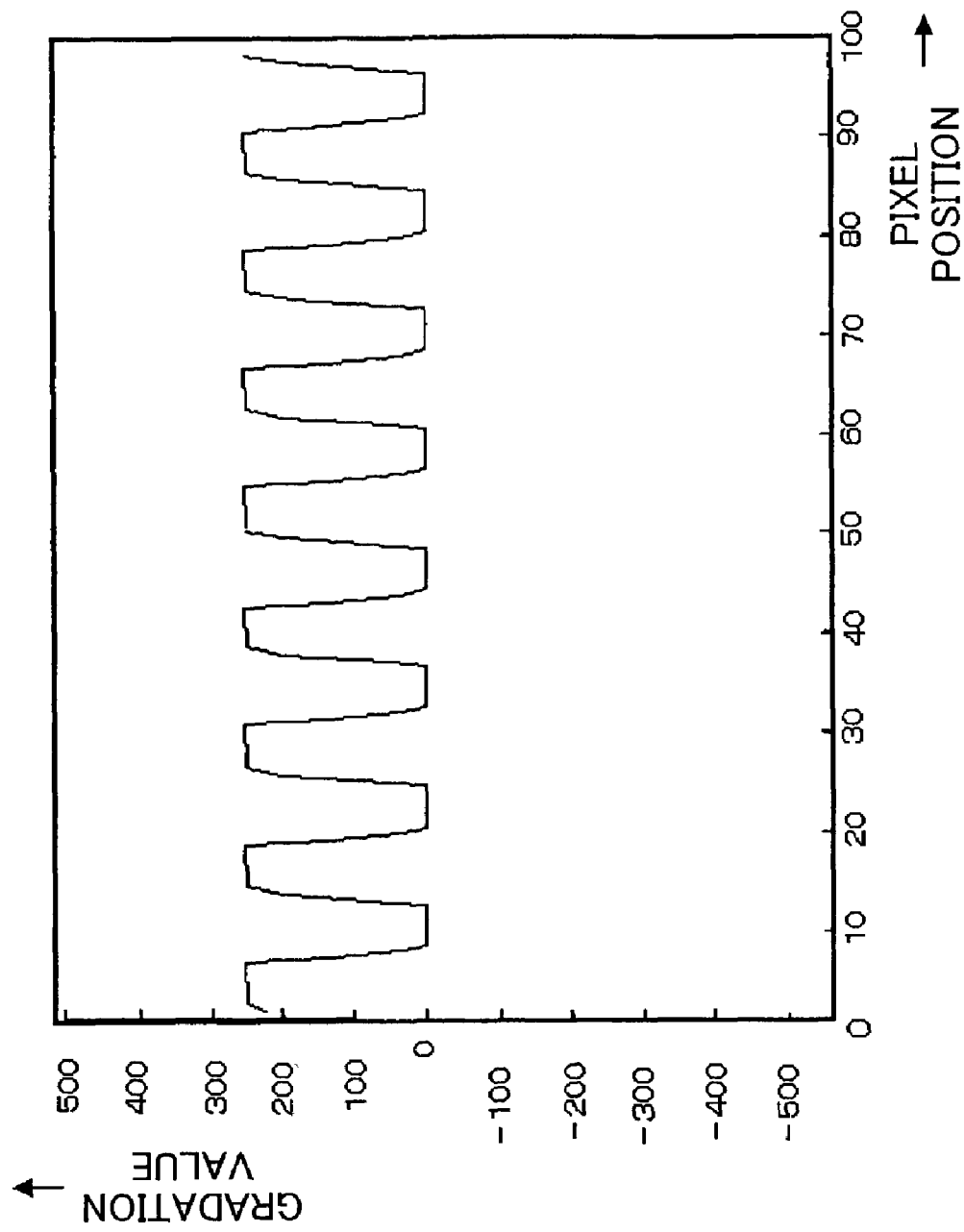
FIG. 15 is a graph showing plotted image data, which is obtained by applying to the image data of FIG. 11 an MTF correction filtering process of an input of 8 bits and an output of 8 bits.

In a case in which an MTF correction filtering process is applied by the spatial filter 21, when the computation circuit of the spatial filter 21 is provided with the number P of bits of input image data is 8 bits and the number q of bits of output image data is also 8 bits, the gradation values of the image data becomes that shown in FIG. 15 since output data saturates at 0 and 255 when the computed data to be output is less than 0 or greater than 255. Such image data contains a higher harmonic wave, and there is a possibility of generation of moiré in the real space. It should be noted that FIG. 15 is a graph showing plotted image data which is obtained by applying to the image data of FIG. 11 the MTF correction filtering process of which spatial filtering computation is based on 8-bit input and 8-bit output.

Figure 16:
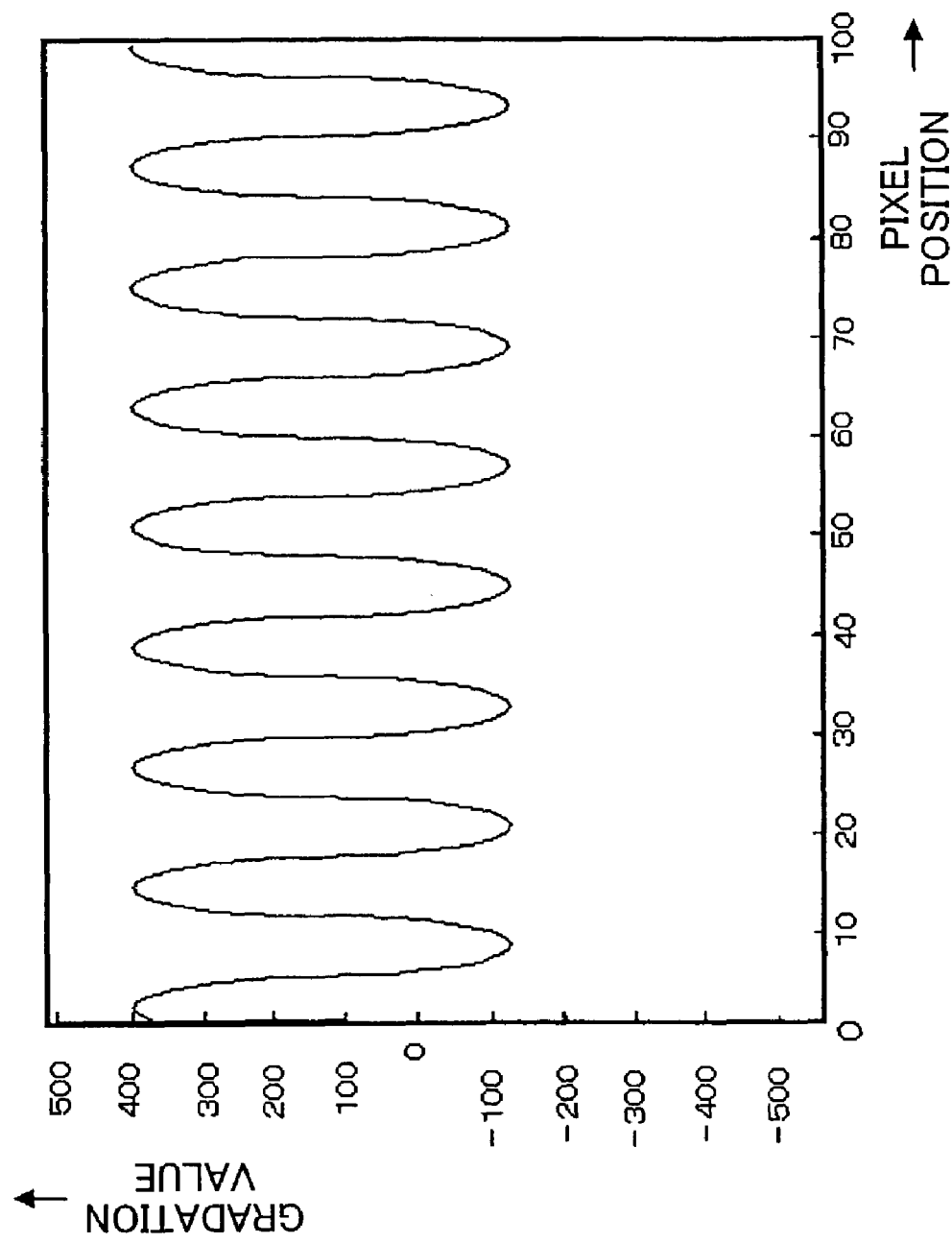
FIG. 16 is a graph showing plotted image data, which is obtained by applying to the image data of FIG. 11 an MTF correction filtering process of an output of q=10 bits.

On the other hand, the possibility of generation of moiré is reduced in the MTF correction filtering process of the spatial filter 21 having the output q bits expanded from the input p bits, that is, having an output dynamic range larger than the input dynamic range so as to prevent saturation in the output waveform. For example, if the MTF correction filtering process of the spatial filter 21 is q=10 bits with respect to the input image data of P=8 bits, the output dynamic range is as large as −512 to +512. When the above-mentioned MTF correction filtering process with the expanded dynamic range of q=10 bits is applied to the image data read by scanner 200 of m=600 dpi, for example, the image data of FIG. 11, the output image data becomes that shown in FIG. 16 in which there is no higher harmonic wave. It should be noted that the expansion of the dynamic range is not limited to −512 to +512, and, if not saturated, the dynamic range can be 0 to +1024 or −256 to +768.

After being corrected by the spatial filter 21, the image data is changed to p=8 bits by the gamma correction unit 23 so as to be saturated at 0 and 255. This returns to the image data of p=8 bits which does not have moiré. FIG. 14 is a graph showing a frequency characteristic of the image data returned to p=8 bits in the stage of a gamma correction to the image data shown in FIG. 16, which has been subjected to the MTF correction.

The image data of n=1200 dpi and p=8 bits after the gamma correction is processed by one of a simple binarizing unit 24, a simple binarizing unit 25, a binary error diffusion unit 26, a binary Dither unit 27 and a multi-value Dither unit, and the processed image data is output as an multi-value output or a binary output. That is, binarization or multiplication by several steps is applied to a character area or a Dither process is applied to a photography area, and the processed image data is output to the laser printer 400.

A process selector 29 selects the contents of the output of the output processing unit 30. Moreover, when supplying the read image data to the personal computer or the FCU, the image data is output from the process selector 29 to the controller MFC (parallel bus Pb). On the other hand, when printing image information from the personal computer or the FCU, the image information from the personal computer or the FCU is received by the process selector 29 through the controller MFC (parallel bus Pb), and the image information is sent to the printer 400.

At the time of image formation in a copy mode, a scanner start signal is supplied to the scanner 200 from the system controller 6 of the multi-function controller MFC at a timing matching with an operation of the color printer 400. The scanner 200 supplies to the image processing unit 20 control signals such as a frame effective period signal, a line synchronization signal (subscanning synchronization signal), an image data effective period signal on a line and a pixel synchronization signal (main scanning synchronization signal) and read image data. An image processing control unit, which is not illustrated, supplies a control signal in the image picture processing 20 which synchronizes with these control signals to each processing functional units 21-29. R, G, B image data (respectively p=8 bits) produced by the scanner 200 is supplied to the spatial filter 21 of the image processing unit 20.

Figure 3:
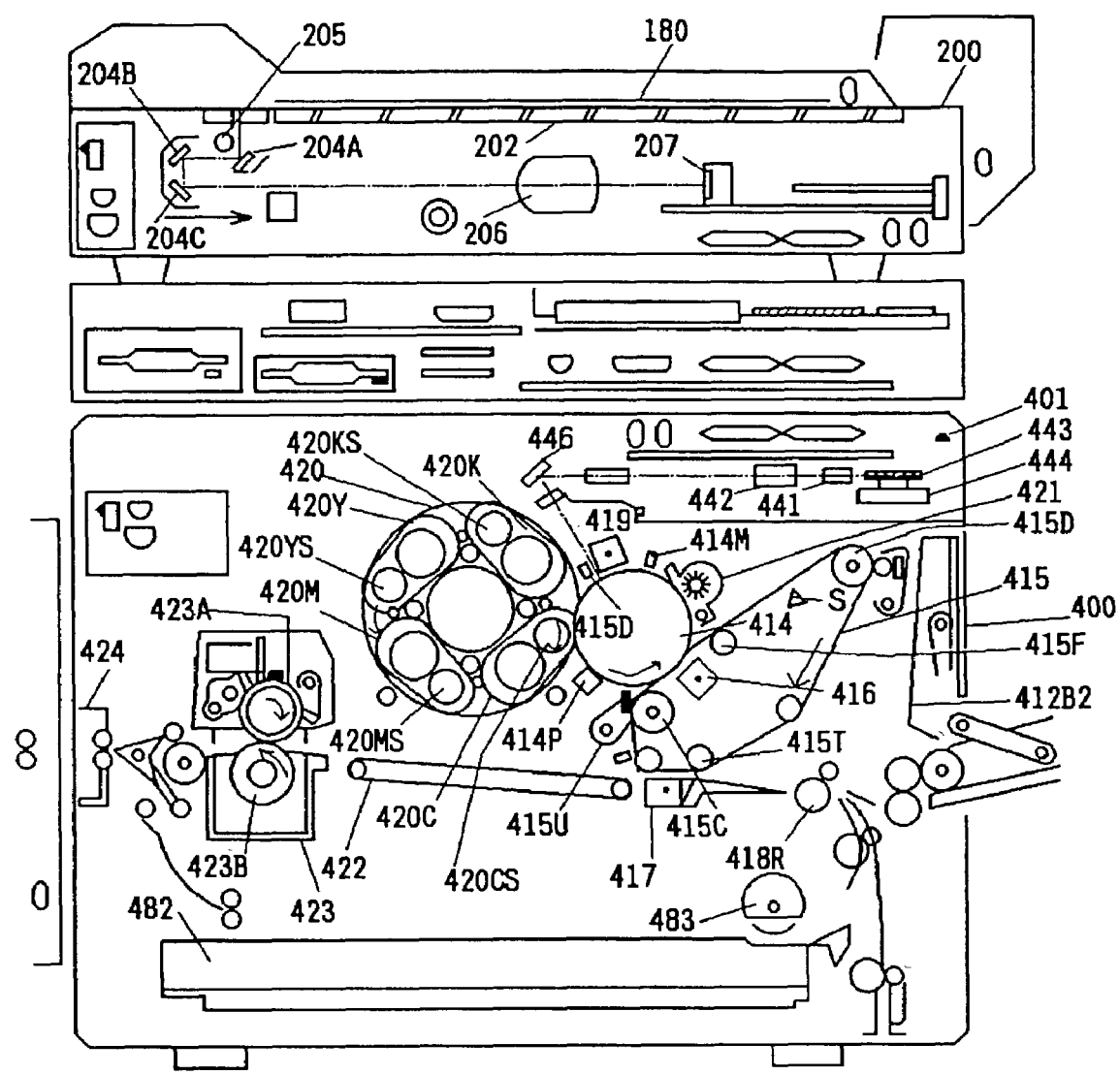
FIG. 3 is a structural diagram showing an outline of a multi-function digital copy machine according to the present invention.

FIG. 3 is a structural diagram showing an outline of the mechanism of the scanner 200 and the printer 400. In the scanner 200 which is a color image reader, a light from a lamp 205 is projected onto an original document 180 placed on a contact glass 202, and the image of the original document 180 is formed on a color sensor 207 though a group of mirrors 204A, 204B, 204C, etc. and a lens 206. The color image information on the original document is read for each color-separation component of blue (B), green (G) and red (R), and is converted into an electric image signal. In this example, the color sensor 207 consists of a three-line CCD sensor, and reads the image of B, G, and R for each color. A color conversion process is performed in a processing unit (not shown in the figure) based on the intensity level of the color-separation image signals of B, G and R obtained by the scanner 200. Thus, the color image data containing recording information regarding black (Bk), cyan (C), magenta (M) and yellow (Y) is obtained.

The images of Bk, C, M and Y are superimposed on an intermediate transfer belt by using the color image data, and the thus-formed color image is transferred onto a transfer paper. Upon receiving a scanner start signal which matches an operation timing of the color printer, the scanner 200 scans the original document by moving an optical system including the lamp 205, the group of mirrors 204A, 204B, 204C, etc. so as to obtain image data corresponding to a single color for each scan. The color image data is visualized sequentially one by one, and the visualized images are superimposed on the intermediate transfer belt so as to form a full-color image consisting of the four color components.

A write-in optical unit 401 as exposure means of the color printer 400 converts the color image data from the scanner 200 into an optical signal, so as to form electrostatic latent images on a photoconductor drum 414 by performing optical writing corresponding to the original image. The write-in optical unit 401 comprises a laser oscillator 441, a luminescence drive control part (not shown in the figure) which drives the laser oscillator 441, a polygon mirror 443, a motor 444 for rotating the polygon mirror 443, an fθ lens 442 and a reflective mirror 446. The photoconductor drum 414 rotates counterclockwise as indicated by an arrow. Arranged around the photo conductor drum 414 are a photoconductor cleaning unit 421, a discharge lamp 414M, a charger 419, a potential sensor for detecting a latent image on the photoconductive drum 414, a selected developer of a revolver development device 420, a development concentration pattern detector 414P and an intermediate transfer belt 415.

The revolver development device 420 comprises a BK developer 420K, a C developer 420C, an M developer 420M and a Y developer 420Y and a revolver rotation drive part (not shown in the figure). The revolver rotation drive part rotates each of the developers counterclockwise as indicated by an arrow. Each developer comprises a development sleeve and a development paddle. The development sleeves 420KS, 420CS, 420MS and 420YS rotate while making ears or spikes formed by developer contact with the surface of the photoconductor drum 414 so as to form electrostatic latent images. The development paddle agitates the developer while pumping up the developer. In a waiting mode, the revolver development device 420 is set in a state where the development is carried out by the BK developer 420. When a copy operation is started, reading of BK image data is started at a timing of the scanner 200, and an optical write-in by the laser, that is, a formation of a latent image is started based on the image data. Herein after, the electrostatic latent image according to the Bk image data is referred to as a Bk latent image. The same operation is performed with respect to each image data of C, M and Y. In order to enable the development start from a leading edge of the Bk latent image, the development sleeve 420KS starts to rotate before the reading edge of the latent image reaches the development position of the Bk developer 420K so as to develop the Bk latent image by a Bk toner. Thereafter, the development operation of the Bk latent-image area is continued. When a trailing edge of the latent image passes through the position of the Bk development, the revolver development device 420 is promptly driven to rotate from the development position by the Bk developer 420K to a development position of the developer of the subsequent color. This rotation is completed before a leading edge of a latent image of the next image data.

When the image formation cycle is started, the photoconductor drum 414 rotates counterclockwise as indicated by the arrow, and the intermediate transfer belt 415 rotates clockwise by being driven by a drive motor, which is not illustrated. BK toner image formation, C toner image formation, M toner image formation and Y toner image formation are performed one by one in association with the rotation of the intermediate transfer belt 415. Finally, a superimposed toner image is formed on the intermediate transfer belt 415 in the order of BK, C, M and Y. Formation of the BK image is performed as follows.

The charger 419 uniformly charges the photoconductive drum 414 by the corona discharge at a negative load of about −700 V. Subsequently, the laser diode 441 performs raster exposure based on the Bk signal. When a raster image is thusly exposed, an electric charge corresponding to an amount of exposure is eliminated in the exposed part of the uniformly charged photoconductive drum 414, thereby forming an electrostatic latent image. The toner in the revolver development device 420 is negatively charged by being agitated by a ferrite carrier. Moreover, the BK development sleeve 420KS of the development device is biased with respect to a metal base layer of the photoconductive drum 414 at a potential of superimposed negative potential and alternating current by a power supply circuit (not shown in the figure). Consequently, the toner does not adhere to the part of the photoconductor drum 414 in which the charge remains. On the other hand, the Bk toner is adsorbed by a part having no charge, i.e., the exposed part, and a Bk visible image similar to the latent image is formed. The intermediate transfer belt 415 engages with a drive roller 415D, a transfer opposite roller 415T, a cleaning opposite roller 415C and a group of idle rollers, and is rotated by a drive motor, which is not illustrated.

The Bk toner image formed on the photoconductor drum 414 is transferred onto the surface of the intermediate transfer belt 415, which is driven at a constant speed while being brought into contact with the photoconductive drum, by a belt-transfer corona charger 416 (hereinafter referred to as a belt transfer part). Hereafter, the transferred toner image from the photoconductor drum 414 to the intermediate transfer belt 415 is referred to as a belt transfer. A slight amount of the residual toner on the photoconductive drum 414 is collected by a photoconductive drum cleaning unit 421 for reuse by the photoconductive drum 414. The collected toner is stored in a waste toner tank (not shown in the figure) via a recovery pipe.

It should be noted that a four-color superimposed belt transfer image is formed on the intermediate transfer belt 415 by sequentially positioning the BK, C, M, Y toner images, which are sequentially formed on the photoconductor drum 414, and, thereafter, a transfer to a transfer paper is carried out by a corona discharge transfer device. On the side of the photo conductor drum 414, the operation proceeds to the C image forming process after the BK image forming process. Reading of C image data by the canner 200 starts at a predetermined timing so as to form the C latent image by a laser write-in according to the image data. After the trailing edge of the preceding BK latent image passes through the development position and before the leading edge of the C latent image reaches the development position, the revolver development device is rotated so that the C latent image is formed by the C toner by the C developer 420C. Thereafter, although the development of C latent-image area is continued, when the trailing edge of the latent image passes by, the revolver development device 420 is driven as is the same as the case of the preceding BK developer so as to move the C developer 420C and locate the subsequent M developer 420M at the development position.

This operation also is performed before the leading edge of the M latent image reaches the development position. It should be noted that the image forming process of M and Y is similar to the image data reading, the latent image formation and development operation of the above-mentioned Bk image and C image, and descriptions thereof will be omitted.

A belt cleaning apparatus 415U comprises of an inlet-port seal, a rubber blade, a discharge coil and contacting mechanism for these inlet-ports seal and the rubber blade. After carrying out the belt transfer of the Bk image of the first color and while carrying out the belt transfer of the second through fourth colors, the inlet-port seal and the rubber blade are made separate from the surface o the intermediate transfer belt by the contacting mechanism.

A paper transfer corona discharger 417 (hereinafter, referred to as a paper transfer device) applies AC+DC or DC component to the transfer paper and, the intermediate transfer belt according to a corona discharge method so as to transfer the superimposed toner image formed on the intermediate transfer belt 415 to the transfer paper.

The transfer papers are accommodated in the transfer-paper cassette 482, and are fed and conveyed by a feed roller in a direction toward a pair of register rollers 418R. It should be noted that reference numeral 412B2 indicates a paper feed tray for manually feeding an OHP paper, a paste board, etc. The transfer paper is fed at a time of start of the image formation, and is set in a standby state at a part of a nip portion of the pair of register rollers 418R. Then, the pair of register rollers 418R are driven when the leading edge of the toner image on the intermediate transfer belt 415 reaches the paper transfer device 417 so that the leading edge off the transfer paper aligns with the leading edge of the toner image. Thus, the transfer paper is stacked on the color superimposed image on the intermediate transfer belt, and passes through the paper transfer device 417, which is connected to a positive electric potential. At this time, the transfer paper is charged with a positive electric charge by a corona-discharge current, and the toner image is transferred onto the transfer paper. Thereafter, the transfer paper is discharged when passing a separation electric discharge device comprising an electric discharge brush, which is arranged on the left-hand side of the paper transfer device 417. Thereby, the transfer paper exfoliates from the intermediate transfer belt 415, and transfers to a paper conveyance belt 422. The transfer paper onto which the four-color superimposed toner image is transferred from the intermediate transfer belt is conveyed to a fixing device 423 by the paper conveyance belt 422, and the toner image is melted and fixed at a nip portion between a fixing roller 423A, which is controlled at a predetermined temperature, and a pressurization roller 423B. Thereafter, the transfer paper is fed outside the main body by a pair of eject rollers 424, and is stacked on a copy tray (not shown) with a front surface facing upward.

It should be noted that the surface of the photoconductor drum 414 after the belt transfer is cleaned by a photoconductor cleaning unit 421, which comprises a brush roller, a rubber blade, etc. Additionally, the photoconductor drum 414 is uniformly discharged by an electric discharge lamp 414M. The surface of the intermediate transfer belt 415 after the toner image is transferred thereto is cleaned again by the blade being pressed by the blade contacting mechanism of the cleaning unit 415U. In a case of a repeat copy, the operation of the scanner and the image formation on the photoconductor drum proceeds to a process for the subsequent sheet after the completion of the process of fourth color image of the first sheet at a predetermined-timing. Then, a BK toner image for the second sheet is transferred on the surface of the intermediate transfer belt 415, which has been cleaned by the belt cleaning device, subsequent to the transfer process of the four-color superimposed image to the transfer paper of the first sheet. Thereafter, operations the same as that of the first sheet are performed.

Second Embodiment

Figure 4:
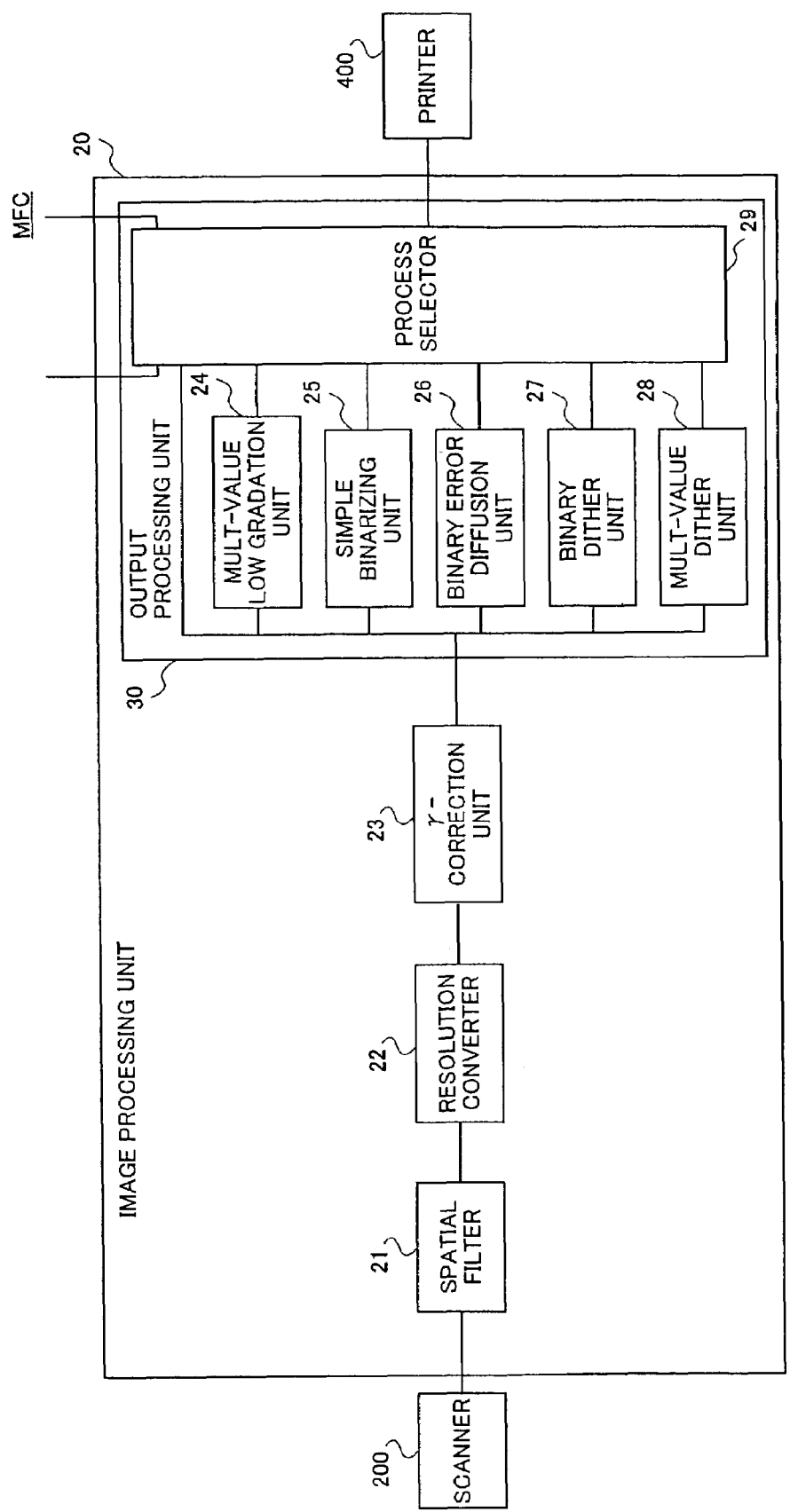
FIG. 4 is a block diagram of an image processing unit of a digital full color copy machine according to a second embodiment of the present invention.

FIG. 4 is a block diagram of an image processing unit 20 of a digital full color copy machine according to a second embodiment of the present invention. The image signal of R, G, B read by the scanner with m dpi (m pixels per inch) is converted into p-bit digital image data by A/D conversion, and is output as color image data of p bits. For example, m=600 and p=8. After being subjected to various processes by the image processing unit 20, the image data is output to the laser printer 400.

The spatial filter 21 of the image processing unit 20 performs an emphasis process of the edge information of a character part or a picture part of the image, that is a modulation transfer function (MTF) correction and a smoothing process for suppressing the moiré due to a halftone image of the original document. The MTF correction and the smoothing process are selectively performed in response to whether the image is a photograph or a character.

The resolution converter 22 performs a high-resolution conversion from m dpi to n dpi. Where, m<n, and, for example, m=600 and n=1200. That is, for example, the resolution converter 22 converts the image data group of 600 dpi into image data group of 1200 dpi according to an interpolation method.

The gamma correction unit 23 performs the image data correction, which matches the image reading characteristic of the scanner 200 with the image expression characteristic of the printer 400. Moreover, the gamma correction unit 23 performs an image data correction for the concentration adjustment corresponding to the concentration adjustment input from the operation board OPB.

A process selector 29 selects the contents of the output of the output processing unit 30. Moreover, when supplying the read image data to the personal computer or the FCU, the image data is output from the process selector 29 to the controller MFC (parallel bus Pb). On the other hand, when printing image information from the personal computer or the FCU, the image information from the personal computer or the FCU is received by the process selector 29 through the controller MFC (parallel bus Pb), and the image information is sent to the printer 400.

At the time of image formation in a copy mode, a scanner start signal is supplied to the scanner 200 from the system controller 6 of the multi-function controller MFC at a timing matching with an operation of the color printer 400. The scanner 200 supplies to the image processing unit 20 control signals such as a frame effective period signal, a line synchronization signal (subscanning synchronization signal), an image data effective period signal on a line and a pixel synchronization signal (main scanning synchronization signal) and read image data. An image processing control unit, which is not illustrated, supplies a control signal in the image picture processing 20 which synchronizes with these control signals to each processing functional units 21-29. R, G, B image data (respectively p=8 bits) produced by the scanner 200 is supplied to the spatial filter 21 of the image processing unit 20.

A description will now be given of various modes of operation of the image processing unit 20 shown in FIG. 4.

Figure 5A:
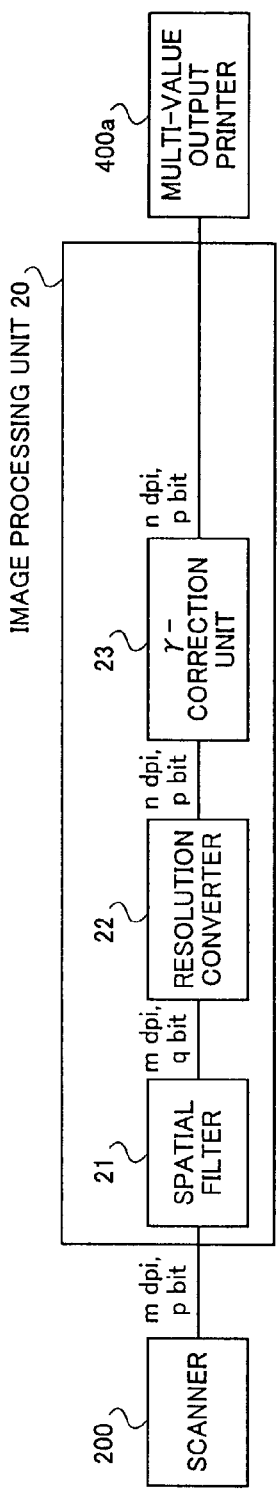
FIG. 5A is a block diagram showing a first mode of operation of the image processing unit shown in FIG. 4.

First Mode of Second Embodiment (FIG. 5A)

FIG. 5A is a block diagram showing a first mode of operation of the image processing unit 20. In this mode, a multi-value data output is selected by the output processing unit 30 of the image processing unit 20, and a single pixel is recorded by multiple values by the multi-value printing function of the printer 400. In this mode, first, the a filtering process of the spatial filter 21 having an input of m dpi and p bits and an output of m dip and q bits is applied to the image data of m dpi and p bits read by the scanner 200. Here, p<q, and, for example, p=8 and q=10.

Thereafter, with the resolution converter 22, a resolution conversion of an input of m dpi nd q bits and an output of n dpi and p bits is performed, and a gamma correction is applied by the gamma correction unit 23. Then, in this mode, the image data of n dpi and p bits is supplied to the printer 400 of an output of n dpi and p bits through the output processing unit 30. Here, m<n, and, for example, m=600 and n=1200.

In a case in which an MTF correction filtering process is applied by the spatial filter 21, when the computation circuit of the spatial filter 21 is provided with P=8 bits of input image data and the number q=8 bits of output image data, the gradation values of the image data becomes that shown in FIG. 15 since output data saturates at 0 and 255 when the computed data to be output is less than 0 or greater than 255. Such image data contains a higher harmonic wave, and there is a possibility of generation of moiré in the real space. It should be noted that FIG. 15 is a graph showing plotted image data which is obtained by applying to the image data of FIG. 11 the MTF correction filtering process of which spatial filtering computation is based on 8-bit input and 8-bit output.

On the other hand, the possibility of generation of moiré is reduced in the MTF correction filtering process of the spatial filter 21 having the output q bits expanded from the input p bits, that is, having an output dynamic range larger than the input dynamic range so as to prevent saturation in the output waveform. For example, if the MTF correction filtering process of the spatial filter 21 is q=10 bits with respect to the input image data of P=8 bits, the output dynamic range is as large as −512 to +512. When the above-mentioned MTF correction filtering process with the expanded dynamic range of q=10 bits is applied to the image data read by scanner 200 of m 600 dpi, for example, the image data of FIG. 11, the output image data becomes that shown in FIG. 16 in which there is no higher harmonic wave. It should be noted that the expansion of the dynamic range is not limited to −512 to +512, and, if not saturated, the dynamic range can be 0 to +1024 or −256 to +768.

After the resolution conversion is performed by the resolution converter subsequent to the spatial filter 22 from a space of m=600 dpi to a space of n=1200 dpi, the image data is made to be p=8 bits so as to saturate at 0 and 255. Thereby, the image data is returned to 8-bit data, which does no generate moiré. FIG. 14 is a graph showing a frequency characteristic of the image data after the resolution conversion by the resolution converter is applied to the image data which has been subjected to the MTF correction shown in FIG. 16.

The gamma correction of the gamma correction unit 23, which is a nonlinear process, is performed on the output image data which has been subjected to the MTF correction in a space of n=1200 dpi. Since the visible image is formed by the printer of a multi-value output based on the gamma corrected image data, there is no generation of moiré in the output of the printer 400a. The printer 400a of a multi-value output may be a well-known power modulation type, PWM modulation type or combination of the aforementioned.

Since the first mode of the second embodiment does not need a complicated halftone processing method, there is an effect in the simplification of hardware. It is effective especially when the multi-value printer 400a, which operates at a high frequency after the resolution conversion, is a low speed printer that is easy to produce.

Figure 5B:
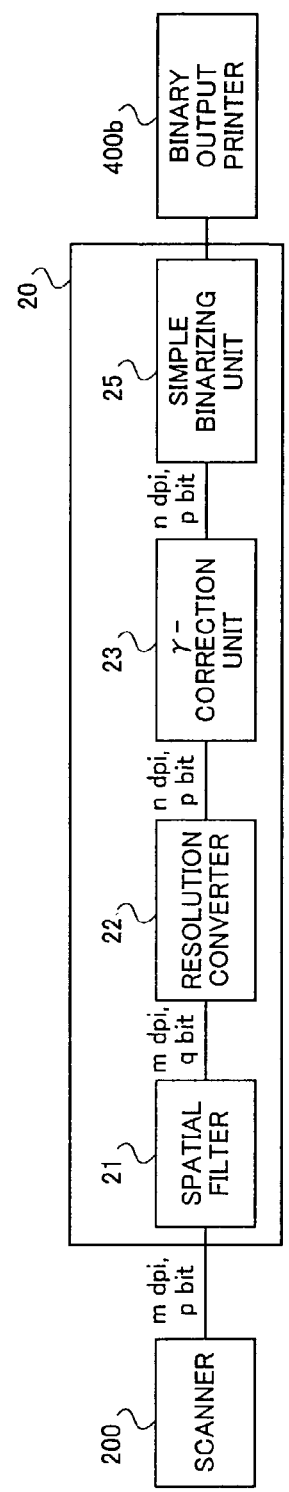
FIG. 5B is a block diagram showing a second mode of operation of the image processing unit shown in FIG. 4.

Second Mode of Second Embodiment (FIG. 5B)

FIG. 5B is a block diagram showing a second mode of operation of the image processing unit 20. In this mode, a simple binary data output is selected by the output processing unit 30 of the image processing unit 20, and a single pixel is recorded by binary values by the binary printing function of the printer 400b. Although the outline of the process flow in this mode is the same as the above-mentioned first mode of the second embodiment, the printer 400 outputs a binary image. In the output processing unit 30, the simple birarizing unit 25 binarizes the multi-value data of p bits after the gamma correction by the gamma correction unit 23. The simple binarizing is a process which outputs 1 if input data is greater than a fixed threshold value and outputs 0 if it is smaller than 0. The factor of generation of moiré originates in the saturation of output data of the MTF correction filter process by the spatial filter 21. In addition, a nonlinear process such as the gamma correction (23) or a binarization (25) may also cause generation of moiré.

As in the present mode, if the resolution m dpi of the scanner 200 as input means is sufficiently higher (more than four times) than the resolution n dpi of the printer 400 as-the output means, there is less generation of moiré caused by folding of a harmonic wave generated in the spatial filter 21, the gamma correction unit 23 or the simple binarizing unit 25. Therefore, even when there is provided only a binary output means, the moiré suppressing effect can be obtained with the above-mentioned simple structure.

It is preferable that the second mode of operation of the second embodiment is performed when outputting the scanner output of, for example, input m=600 dpi to a general binary output printer (400b) of n=2400 dpi.

Figure 5C:
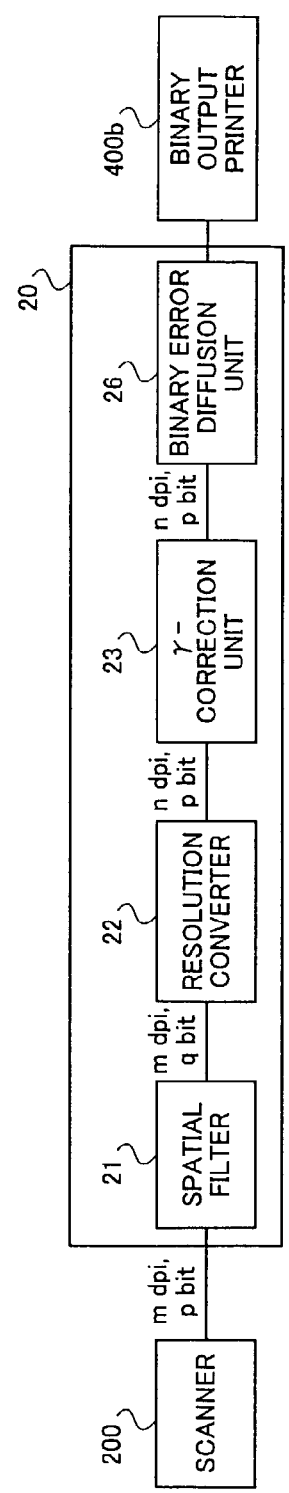
FIG. 5C is a block diagram showing a third mode of operation of the image processing unit shown in FIG. 4.

Third Mode of Second Embodiment (FIG. 5C)

FIG. 5C is a block diagram showing a third mode of operation of the image processing unit 20. In this mode, a binary error diffusion output is selected by the output processing unit 30 of the image processing unit 20, and a single pixel is recorded by binary values by the binary printing function of the printer 400b. Although an outline of the process flow in this mode is the same as that of the first mode of the second embodiment, since the binary image is output by the printer 400b as output means, the binary error diffusion unit 26 binarizes the multi-value data which has been subjected to the gamma correction of the gamma correction unit 23. If the resolution of the printer 400 as output means is not so higher (about twice) than the scanner 200 as input means, generation of moiré due to the simple binarization can be sufficiently suppressed. Therefore, a non-period halftone process method such as an error diffusion is needed. Although an amount of process of the error diffusion is large, suppression of moiré can be achieved by the error diffusion.

It is preferable that the third mode of operation of the second embodiment is performed when outputting the scanner output of, for example, input m=600 dpi to a general binary output printer of n=1200 dpi.

Figure 6:
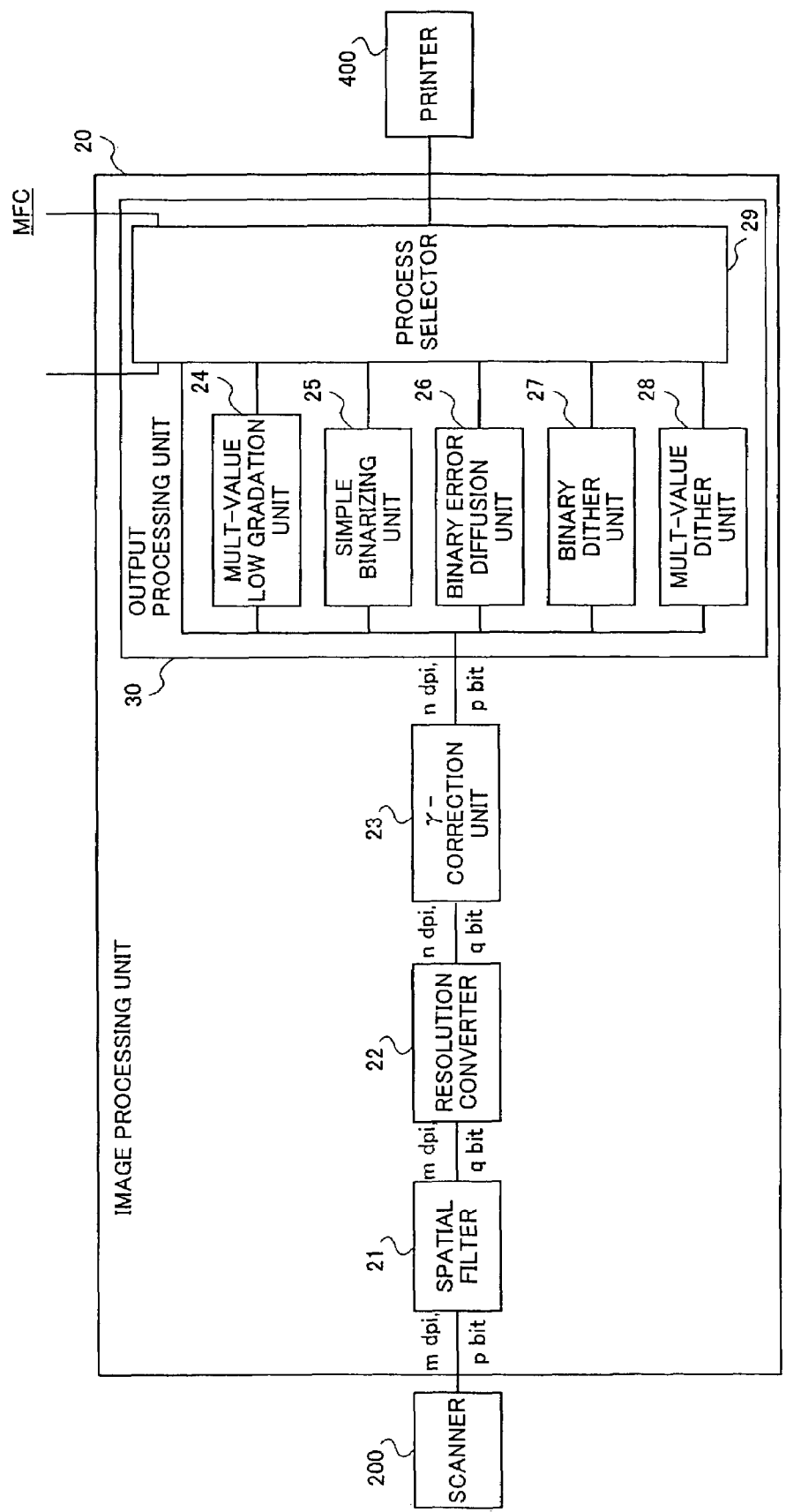
FIG. 6 is a block diagram of an image processing unit of a digital full color copy machine according to a third embodiment of the present invention.

Third embodiment (FIG. 6)

FIG. 6 is a block diagram of the image processing unit 20 of a digital full color copy machine according to the third embodiment of the present invention. In the third embodiment, the order of processes of the resolution converter 22 and the spatial filter 21 in the above-mentioned first embodiment is counterchanged. That is, in the third embodiment, the image data of m dpi and p bits, which is read by the scanner 200, is subjected to the filtering process of the spatial filter 21 of an input of m dpi and p bits and an output of m dpi and q bits. Here, m<n, and, for example, m=600 and n=1200, and p<q, for example p=8 and q=10.

Thereafter, the resolution conversion of an input of m dpi and q bits and an output of n dpi and q bits is performed by the resolution converter 22, and the image data is changed to n dpi and p bits by the gamma correction unit 23. Then, the image data is output by the printer 400 through the output processing unit 30. The effect of the third embodiment is the same as that of the first embodiment, and, thus, there is no generation of moiré.

Fourth Embodiment (FIG. 7)

Figure 7A:
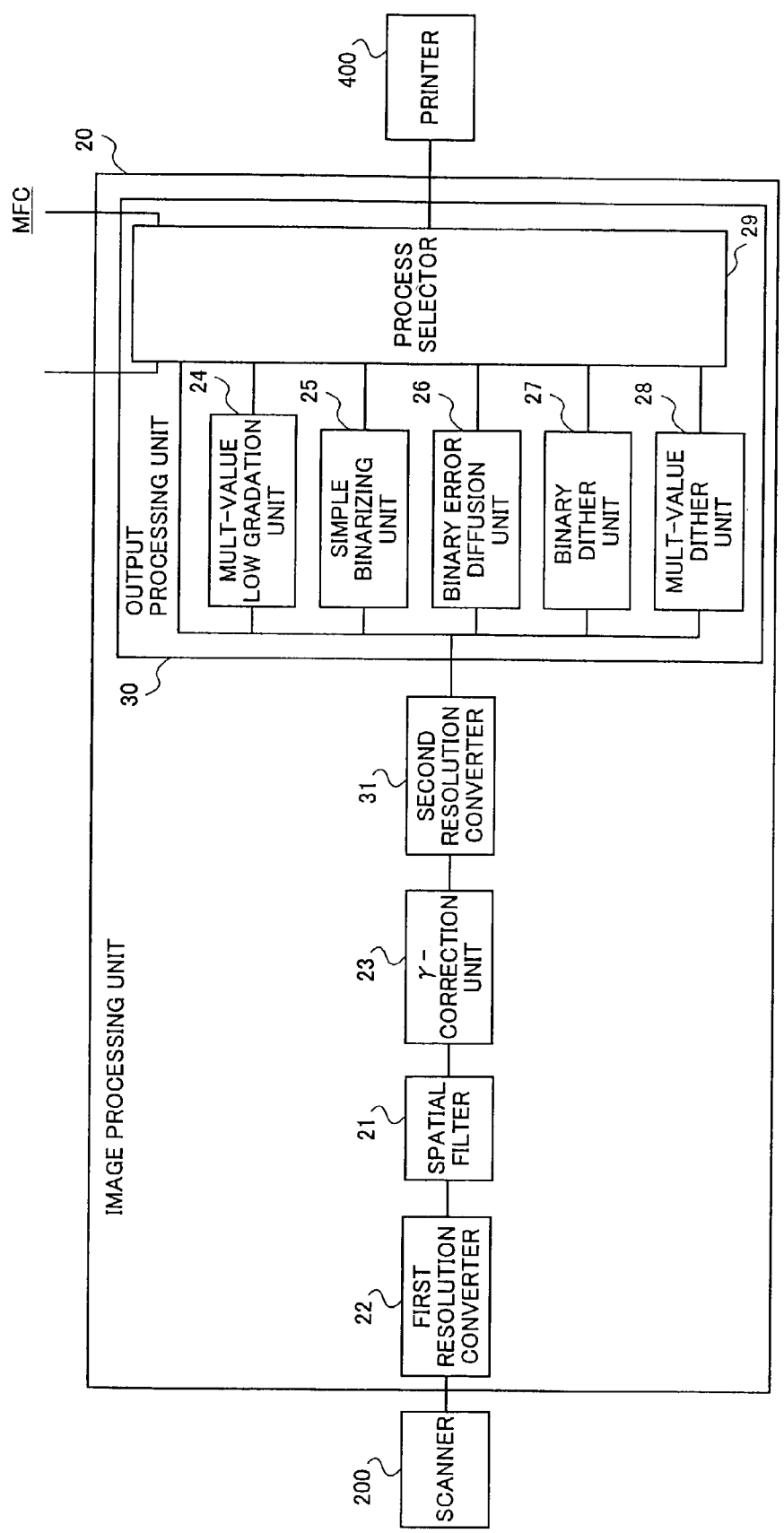
FIG. 7A is a block diagram of an image processing unit according to a fourth embodiment of the present invention.
Figure 7B:
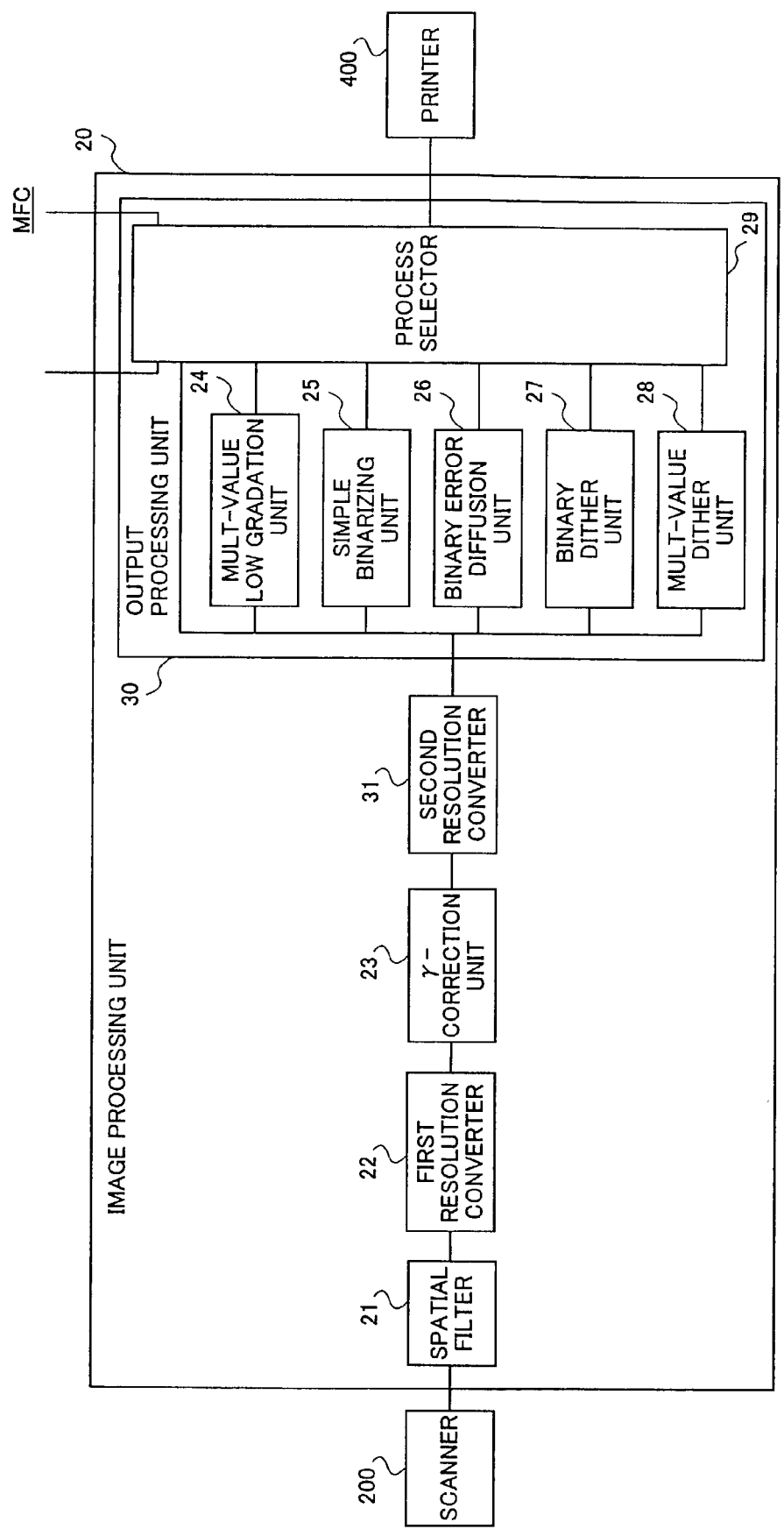
FIG. 7B is a block diagram of a variation of the image processing unit according to the fourth embodiment of the present invention.

FIG. 7A is a block diagram of the image processing unit 20 according to a fourth embodiment of the present invention. FIG. 7B is a block diagram of a variation of the image processing unit shown in FIG. 7A. The composition and the functions other than the image processing unit 20 of the copy machine according to the fourth embodiment are the same as that of the above-mentioned second embodiment. A description will now be given of modes of operation of the image processing unit 20 according to the fourth embodiment.

Figure 8A:
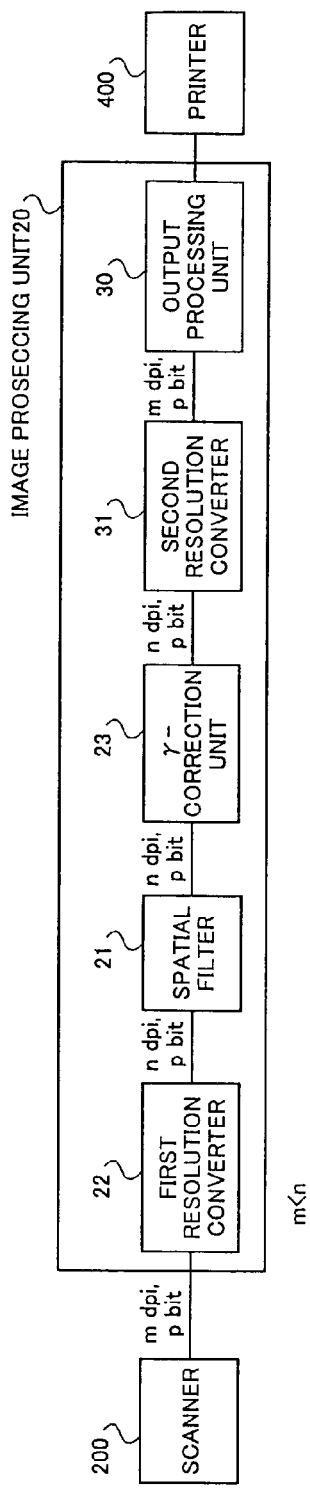
FIG. 8A is a block diagram of the image processing unit shown in FIG. 7A which performs a first mode of operation of the fourth embodiment.

First Mode of Fourth Embodiment (FIG. 8A)

FIG. 8A is a block diagram of the image processing unit 20 shown in FIG. 7A. The spatial filter 21 shown in FIG. 8A is an MTF filter such as a laplacian filter, which can handle, for example, a 3×3-pixel matrix and emphasizes an image edge. FIG. 11 shows an example of the image which is read by the scanner 200. Although an actual picture input device may perform 2-dimensional image reading, it is illustrated by one dimension in FIG. 11 for the sake of simplification of explanation. This figure corresponds to a case in which an equal interval sampling is made to a periodical image such as a halftone image.

Figure 17:
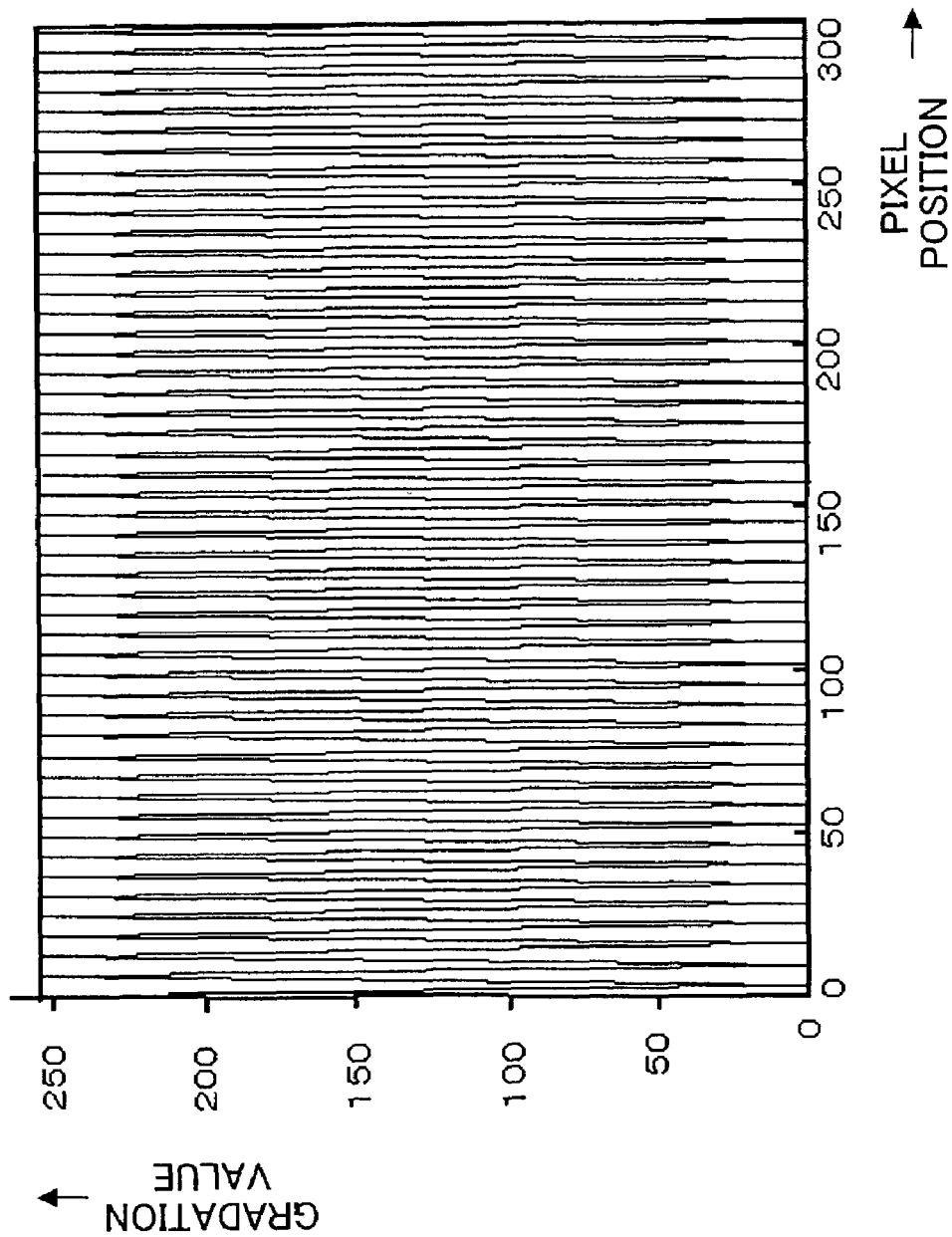
FIG. 17 is a graph showing an example of plotted image data, which is obtained by applying to the image data of FIG. 11 an MTF correction filtering process of an input of 8 bits and an output of 8 bits.

If it is an ordinary process, the image is filtered. FIG. 17 is a graph showing an example of the image after the filtering. A part of image data is saturated at 0 or 255 due to the emphasis process. This is observed as moiré in the image.

In this first mode, when the MTF filtering process is applied to the image data shown in FIG. 11 by the spatial filter 21, the density of the image data is changed to a double by the resolution converter 22 according to the three-dimensional function convolution method so as to suppress moiré. That is, the image data is converted to higher density data. FIG. 12 is a graph showing the image data after being changed to a double density. That is, FIG. 12 is a graph in which the resolution converted image data is plotted, the resolution converted image data being obtained by inserting interpolation data obtained by the three-dimensional function convolution method based on the image data of FIG. 11. FIG. 13 is a graph showing a result of frequency analysis performed on the data of FIG. 12.

Next, an MTF correction filtering process (emphasis of an edge of image, i.e., edge emphasis) used in an ordinary copy machine is applied to the image data of FIG. 12 by the spatial filter shown in FIG. 8A. By the MTF correction filtering process, the edge part of line drawing parts such as characters, can be made sharp. When the operation of the spatial filtering process is p=8 bits and if the image data is less than 0 or greater than 255, it is saturated at 0 and 255.

Therefore, a harmonic wave component, which is not present in the original waveform, is generated. FIG. 14 is a graph showing a frequency characteristic after applying the above-mentioned MTF correction filtering process to the image data of FIG. 12.

After applying the gamma correction to the image data which has been subjected to the MTF correction filtering process, the resolution conversion is applied by the resolution conversion unit 31 so as to be one half of the density, which is the same density as the input image data. That is, in FIG. 14, the frequency-higher than 300 lpi becomes unnecessary in the horizontal axis, and it becomes the cause of generation of moiré. Therefore, the resolution converter 31 performs the resolution conversion to one half by a smoothing filter, which cut off frequencies higher than 300 lpi, and a down sampling by thinning. Thereafter, a predetermined output process is applied by the output processing unit 30, and the processed image data is output to the printer.

According to the first mode operation of the fourth embodiment, even if the resolution of scanner is relatively low such as 600 dpi, an image having the same quality as that obtained by reading by a high-resolution scanner of about 1200 dpi can be obtained.

Figure 8B:
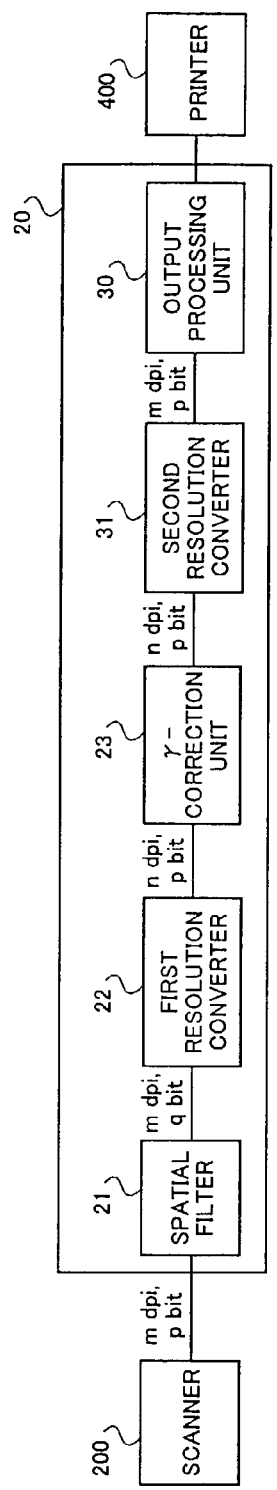
FIG. 8B is a block diagram of the image forming unit shown in FIG. 7B, which performs a second mode of operation of the fourth embodiment.

Second Mode of Fourth Embodiment (FIG. 8B)

FIG. 8B is a block diagram of the image forming unit 20 shown in FIG. 7B which performs a second mode of operation of the fourth embodiment. The image data of m dpi and p bits which is read by the scanner 200 is processed by the spatial filter 21. Then, resolution conversion 22 to obtain a higher density is performed by the resolution converter 22. Thereafter, a gamma correction is applied by the gamma correction unit 23, and, then, the image data is changed to a low density data by the resolution converter 31. Then the processed image data is output from the output processing unit 30. Here, the image data as shown in FIG. 11 is supplied to the image processing unit 20 from the scanner 200. The spatial filter 21 in the second mode of operation of the fourth embodiment has an output dynamic range greater than an input dynamic range so that the output waveform hardly saturates. For example, when the computation of the spatial filter is q=10 bits with respect to the image data read by p=8 bits, the dynamic range is −512 to +512. When the MTF correction filtering process is applied to the image data of p=8 bits so as to change to q=10 bits, the output image data of the spatial filter becomes that shown in FIG. 16, and a harmonic wave is not generated due to saturation. It should be noted that the dynamic range may be 0 to +1024 or −256–+768 if saturation does not occur.

As mentioned above, the resolution conversion by the resolution converter 22 is performed after performing the filtering of the spatial filter 21 which has the output dynamic range greater than the input dynamic range so as to prevent saturation. Then, a saturation calculation is performed at 0 and 255 after the resolution conversion. FIG. 14 is a graph showing the frequency characteristic of the image data after being saturated so as to be within a range from 0 to 255 by performing the resolution conversion after applying the MTF correction filtering process of which dynamic range is expanded so that saturation does not occur in the image data shown in FIG. 11.

In the second mode of operation, after performing the resolution conversion to change a space of 600 dpi to a space of 1200 dpi, a value less than 0 is set to 0 and a value greater than 255 is set to 255. Moreover, since the gamma correction, which is a nonlinear process, is performed in the space of n=1200 dpi, generation of moiré hardly occurs.

The subsequent processes are the same as the first mode of operation of the fourth embodiment, and the gamma corrected image data is subjected to the resolution conversion by the resolution converter 31 so as to be one half of the density from n=1200 dpi to m=600 dpi so that the resolution becomes m=600 dpi which is the same as the input image data. At this time, the frequency higher than 300 lpi becomes unnecessary in the horizontal axis in FIG. 14, and it becomes the cause of generation of moiré. Therefore, the resolution converter 31 performs the resolution-conversion to one half by a smoothing filter, which cut off frequencies higher than-300 lpi, and a down sampling by thinning. Thereafter, a predetermined output process is applied by the output processing unit 30, and the processed image data is output to the printer 400.

According to the second mode of operation of the fourth embodiment, even if the resolution of scanner 200 is relatively low such as 600 dpi, an image having the same quality as that obtained by reading by a high-resolution scanner of about 1200 dpi can be obtained. Since the spatial filter 21 is performed before the resolution conversion, the factor matrix of the spatial filter 21 can be reduced as compared to the first mode of operation of the fourth embodiment, and it is effective to reduce hardware for the spatial filtering process.

Figure 8C:
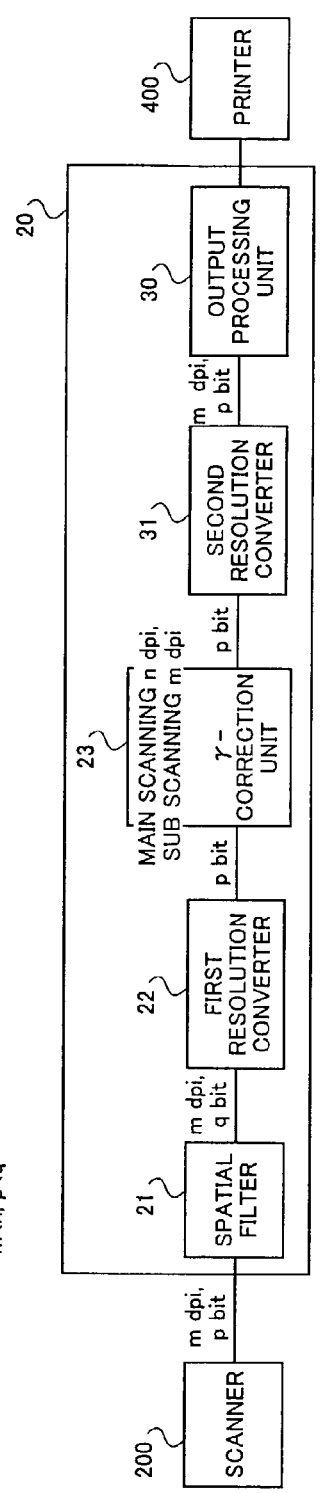
FIG. 8C is a block diagram of the image processing unit 20 shown in FIG. 7B, which performs a third mode of operation of the fourth embodiment.

Third Mode of Fourth Embodiment (FIG. 8C)

FIG. 8C is a block diagram of the image processing unit 20 shown in FIG. 7B in a third mode of operation according to the fourth embodiment. In the third mode of operation, the process of the resolution converter 22 is applied to only one of the main scanning and the subscanning. This is because there is a case in which the elimination of moiré using the resolution conversion of the resolution converter 22 is sufficiently effective even when it is applied to only one of the main scanning and subscanning. Moreover, when the scanner 200 as input means reads an image by un-equal density such as 600 dpi in the main scanning direction and 600 dpi in the subscanning direction, a sufficient moiré elimination effect can be obtained only by performing the resolution conversion in the main scanning direction. Other functions and operations are the same as the second mode of operation of the fourth embodiment.

Thus, if the conversion is according to an integral multiple or a fraction, there is no need to provide large-scale hardware such as multiplication circuit of an arbitrary multiplying power, and a resolution conversion having less image distortion can be achieved with a minimum circuit scale. Accordingly, an image processing system having less moiré can be build with a reduced cost.

Fifth mode of Fourth Embodiment (FIG. 9B)

FIG. 9B is a block diagram of the image processing unit 20 shown in FIG. 7B in a fifth mode of operation of the fourth embodiment. In recent years, general-purpose scanners operate at a relatively high-speed, and one having the specification of m=600 dpi is relatively inexpensive. Additionally, a printer of m=600 dpi can achieve a stable image reproduction at a high-speed operation. Moreover, also in the pixel density after the resolution conversion of the resolution converter 22 to a higher pixel density, according to the condition of the fourth mode, n=1200 dpi, which is twice the density n=600 dpi, is appropriate, and it is difficult to make a printer having a higher pixel density. Thus, according to the current level of technology, the combination of the resolutions shown in FIG. 9B, which indicates the fifth mode of operation, may provide a most effective operation of the fourth embodiment with a low cost.

The present invention is not limited to the specifically disclosed embodiments, and variations and modifications may be made without departing from the scope of the present invention.

The present invention is based on Japanese basic applications No. 2001-154743 filed May 24, 2001, No. 2001-178479 filed Jun. 13, 2001 and No. 2002-138005, filed May 14, 2002, the entire contents of which are hereby incorporated by reference.

What is claimed is:

1. An image processing method comprising:
applying a spatial filtering process with an output dynamic range larger than an input dynamic range and also applying a high-resolution conversion process to increase an image density of image data; and
applying a low-resolution conversion process to decrease the image density after applying to the image data the spatial filtering process and the high-resolution conversion process.

2. The image processing method as claimed in claim 1, wherein the low-resolution conversion process changes the image density to an original image density.

3. The image processing method as claimed in claim 1, further comprising:
applying a gamma correction process to the image data after applying the high-resolution conversion process.

4. The image processing method as claimed in claim 1, wherein the spatial filtering process is a filtering process of a modulation transfer function correction which sharpens an image edge.

5. The image processing method as claimed in claim 1, wherein an output dynamic range of the high-resolution conversion process is smaller than an input dynamic range of the high-resolution conversion process.

6. The image processing method as claimed in claim 1, wherein the high-resolution conversion process is performed either in a main scanning direction or a subscanning direction.

7. The image processing method as claimed in claim 1, wherein the high-resolution conversion process increases the image density by an integral multiple equal to or higher than two.

8. An image processing method comprising:
applying a spatial filtering process to image data so as to increase a number of bits of input image data;
applying a high-resolution conversion to the image data to increase an image density of the image data; and
applying a low-resolution conversion after applying the high-resolution conversion to decrease the image density.

9. The image processing method as claimed in claim 8, wherein the low-resolution conversion process changes the image density to an original image density.

10. The image processing method as claimed in claim 8, further comprising:
applying a gamma-correction process to the image data after applying the high-resolution conversion process.

11. The image processing method as claimed in claim 8, wherein the spatial filtering process is a filtering process of a modulation transfer function correction which sharpens an image edge.

12. The image processing method as claimed in claim 8, wherein an output dynamic range of the high-resolution conversion process is smaller than an input dynamic range of the high-resolution conversion process.

13. The image processing method as claimed in claim 8, wherein the high-resolution conversion process is performed either in a main scanning direction or a subscanning direction.

14. The image processing method as claimed in claim 8, wherein the high-resolution conversion process increases the image density by an integral multiple equal to or higher than two.

15. An image processing apparatus comprising:
a spatial filter which applies a modulation transfer function correction process so as to increase a number of bits of input image data; and
a high-resolution converter which converts the image data into output image data having a density higher than a sampling density of the input image data,
wherein one of the spatial filter and the high-resolution converter processes the image data after the other of the spatial filter and the high-resolution converter has processed the image data; and
wherein the image processing apparatus further comprises a gamma-correction unit which applies a gamma-correction to the image data which has been processed by said high-resolution converter, and a tow-resolution converter which decreases the density of the gamma-corrected image data.

16. An image reading apparatus comprising:
an image reading unit which reads an image or picture to generate image data; and
an image processing apparatus including: a spatial filter which applies a modulation transfer function correction process so as to increase a number of bits of the image dam supplied from said image reading unit; and
a high-resolution convener which converts the image data into output image data having a density higher than a sampling density of the input image data,
wherein one of the spatial filter and the high-resolution converter processes the image data after the other of the spatial filter and the resolution converter has processed the image data; and
wherein the image reading apparatus further comprises a low-resolution converter which decreases the density of the gamma-corrected image data.

17. The image reading apparatus as claimed in claim 16, further comprising a gamma-correction unit which applies a gamma-correction to the image data which has been processed by said high-resolution converter.

18. An image forming apparatus comprising: an image processing apparatus including: a spatial filter which applies a modulation transfer function correction process so as to increase a number of bits of the image data supplied from said image reading unit; and
a high-resolution converter which converts the image data into output image data having a density higher than a sampling density of the input image data;
wherein one of the spatial filter and the high-resolution converter processes the image data after the other of the spatial filter and the high-resolution converter has processed the image data; and
a printer which forms an image on a recording sheet based on the image data output from said image processing apparatus; and
a low-resolution converter which decreases the density of the gamma-corrected image data.

19. The image fanning apparatus as claimed in claim 18, further comprising a gamma-correction unit which applies a gamma-correction to the image data which has been processed by said high-resolution converter.

20. The image forming apparatus as claimed in claim 18, further comprising an image reading unit which reads an image or picture to generate the image data so as to supply the image data to said image processing apparatus.

21. An image fanning apparatus comprising:
a resolution converter which converts image data of p bits, which is obtained by optically reading an original image by a sampling density of m dpi, into high-density image data of n dpi and p bits, where n is greater than m;
a spatial filter changing the high-density image data into large dynamic range image data of n dpi and q bits, where q is greater than p;
a gamma correction unit which adjusts an intensity of the image data after being processed by said spatial filter;
an output processing unit which converts the gamma-corrected image data into output data for printing; and
a printer which produces a visible image based on the output data of said output processing unit.

22. An image forming apparatus comprising:
a spatial filter which changes image data of p bits, which is obtained by optically reading an original image by a sampling density of m dpi, to large dynamic range image data of m dpi and q bits, where q is greater than p;
a resolution converter which converts the large dynamic range image data of m dpi and q bits into high-resolution image data of n dpi and p bits, where n is greater than m;
a gamma correction unit which adjusts an intensity of the image data after being processed by said resolution converter; and
a primer of n dpi and a multiple number of gradation.

23. An image forming apparatus comprising:
a spatial filter which changes image data of p bits, which is obtained by optically reading an original image by a sampling density of m dpi, to large dynamic range image data of m dpi and q bits, where q is greater than p;
a resolution converter which converts the large dynamic range image data of m dpi and q bits into high-resolution image data of n dpi and p bits, where n is greater than m;
a gamma correction unit which adjusts an intensity off the image data after being processed by said resolution converter;
an output processing unit which converts the gamma-corrected image data into output data for printing; and
a printer which produces a visible image based on the output data of said output processing unit.

24. The image forming apparatus as claimed in claim 23, wherein said output processing unit includes a simple binarizing unit which converts the gamma corrected image data into binary data as the output data for printing; and said printer has n dpi and a binary gradation number so as to form a visible image based on the binary data from said simple binarizing unit.

25. The image forming apparatus as claimed in claim 23, wherein said output processing unit includes a binary error diffusion unit which converts the gamma corrected image data into binary data as the output data for printing by a binarization according to an error diffusion method; and said printer has n dpi and a binary gradation number so as to form a visible image based on the binary data from said binary error diffusion unit.

26. An image forming apparatus comprising:
a spatial filter which changes image data of p bits, which is obtained by optically reading an original image by a sampling density of m dpi, to large dynamic range image data m dpi and q bits, where q is greater than p;
a resolution converter which converts the large dynamic range image data of m dpi and q bits into high-resolution image data of n dpi and q bits, where n is greater than m;
a gamma correction unit which adjusts an intensity of the image data after being processed by said resolution converter;
an output processing unit which converts the gamma-corrected image data into output data for printing; and
a printer which produces a visible image based on the output data of said output processing unit.

27. An image forming apparatus comprising: a first resolution converter which converts image data of p bits, which is obtained by optically reading an original image by a sampling density of m dpi, into high-resolution image data of n dpi and p bits, where n is greater than m;
a spatial filter which applies a modulation transfer function (MTF) correction to the high-resolution image data of n dpi and p bits after the conversion of said first resolution convener;
a gamma correction unit which adjusts an intensity of the image data after being processed by said spatial filter;
a second resolution converter which converts the gamma corrected image data of n dpi and p bits into image data of m dpi and q bits;
an output processing unit which converts the image data of n dpi and p bits after the conversion of said second resolution converter into output data for printing; and
a printer which produces a visible image based on the output data of said output processing unit.

28. The image forming apparatus as claimed in claim 27, wherein said first resolution convener changes the image density from m dpi to n dpi in a main scanning direction and from m dpi to m dpi in a subscanning direction.

29. The image funning apparatus as claimed in claim 27, wherein said first resolution converter changes the image density from m dpi to m dpi in a main scanning direction and from m dpi to n dpi in a subscanning direction.

30. The image forming apparatus as claimed in claim 27, wherein n is an integral multiple of m.

31. The image funning apparatus as claimed in claim 30, wherein m is 600 and n is 1200.

32. An image forming apparatus comprising:
a spatial filter which changes image data of p bits, which is obtained by optically reading an original image by a sampling density of m dpi, to large dynamic range image data of m dpi and q bits, where q is greater than p;
a first resolution converter which converts the large dynamic range image data of m dpi and q bits after being processed be said spatial filter into high-resolution image data of n dpi and p bits, where n is greater than m;
a gamma correction unit which adjusts an intensity of the image data after being processed by said first resolution converter;

a second resolution converter which converts the gamma corrected image data of m dpi and p bits into image data of m dpi and p bits;

an output processing unit which converts the image data of m dpi and p bits after the conversion of said second resolution converter into output data for printing; and a printer which produces a visible image based on the output data of said output processing unit.

33. The image forming apparatus as claimed in claim 32, wherein said first resolution converter changes the image density from m dpi to n dpi in a main scanning direction and from m dpi to m dpi in a subscanning direction.

34. The image forming apparatus as claimed in claim 32, wherein said first resolution converter changes the image density from m dpi to m dpi in a main scanning direction and from m dpi to n dpi in a subscanning direction.

35. The image forming apparatus as claimed in claim 32, wherein n is an integral multiple of m.

36. The image fanning apparatus as claimed in claim 35, wherein m is 600 and n is 1200.

* * * * *